United States Patent
Carlson et al.

(10) Patent No.: US 6,757,094 B2
(45) Date of Patent: Jun. 29, 2004

(54) OPTICAL SHUTTER ASSEMBLY

(75) Inventors: Steven A. Carlson, Cambridge, MA (US); Arthur W. Berger, Cambridge, MA (US)

(73) Assignee: Optodot Corporation, Boston, MA (US)

( * ) Notice: Subject to any disclaimer, the term of this patent is extended or adjusted under 35 U.S.C. 154(b) by 0 days.

(21) Appl. No.: 10/447,811

(22) Filed: May 29, 2003

(65) Prior Publication Data

US 2003/0206324 A1 Nov. 6, 2003

Related U.S. Application Data

(60) Division of application No. 09/852,392, filed on May 9, 2001, now Pat. No. 6,583,916, which is a continuation-in-part of application No. 09/706,166, filed on Nov. 3, 2000, now Pat. No. 6,381,059.
(60) Provisional application No. 60/163,349, filed on Nov. 3, 1999.

(51) Int. Cl.[7] .............................. G02F 1/29; G02F 1/01; G02F 1/03; G02B 6/26
(52) U.S. Cl. ........................ 359/299; 359/238; 359/243; 359/244; 385/16; 385/17; 385/18
(58) Field of Search ............................... 359/238, 241, 359/243, 244, 290, 299; 385/16, 17, 18, 19, 20, 24, 128

(56) References Cited

U.S. PATENT DOCUMENTS

| | | | |
|---|---|---|---|
| 3,251,881 A | 5/1966 | Susi et al. | 564/309 |
| 3,341,464 A | 9/1967 | Susi et al. | 252/587 |
| 3,400,156 A | 9/1968 | Milionis et al. | 564/8 |
| 4,656,121 A | 4/1987 | Sato et al. | 430/270.19 |
| 4,923,390 A | 5/1990 | Oguchi et al. | 430/270.19 |

(List continued on next page.)

FOREIGN PATENT DOCUMENTS

| | | |
|---|---|---|
| EP | 0 675 003 A1 | 3/1995 |
| WO | WO 98/54615 | 12/1998 |

*Primary Examiner*—Loha Ben
(74) *Attorney, Agent, or Firm*—Sampson & Associates, P.C.

(57) ABSTRACT

The present invention pertains to an optical shutter comprising an photon-absorbing layer and a surface layer in a transparent state on at least one side of the photon-absorbing layer, wherein the optical shutter is characterized by the absorption of photons to change the photon-absorbing layer to an opaque state and to change the surface layer to a reflective state. The optical shutter is reversibly imageable between these transparent and reflective states. The optical shutter may comprise a metallized layer on at least one side of the photon-absorbing layer. Preferably, the optical shutter comprises an organic free radical compound, such as a salt of an aminium radical cation, in the photon-absorbing layer. Also provided are optical switch devices and optical buffers comprising such optical shutters and methods of switching an optical signal utilizing such optical shutters and switch devices.

71 Claims, 11 Drawing Sheets

U.S. PATENT DOCUMENTS

| | | | |
|---|---|---|---|
| 5,091,984 A | 2/1992 | Kobayashi et al. | 385/16 |
| 5,156,938 A | 10/1992 | Foley et al. | 430/200 |
| 5,171,650 A | 12/1992 | Ellis et al. | 430/20 |
| 5,256,506 A | 10/1993 | Ellis et al. | 430/20 |
| 5,399,459 A | 3/1995 | Simpson et al. | 430/270.1 |
| 5,406,407 A | 4/1995 | Wolff | 359/326 |
| 5,487,080 A * | 1/1996 | Mukherjee | 372/69 |
| 5,501,938 A | 3/1996 | Ellis et al. | 430/201 |
| 5,539,100 A | 7/1996 | Wasielewski et al. | 540/145 |
| 5,605,732 A * | 2/1997 | Mihara et al. | 430/270.18 |
| 5,732,168 A | 3/1998 | Donald | 385/16 |
| 5,740,287 A | 4/1998 | Scalora et al. | 385/6 |
| 5,757,525 A * | 5/1998 | Rao et al. | 359/108 |
| 5,828,799 A | 10/1998 | Donald | 385/16 |
| 5,841,912 A | 11/1998 | Mueller-Fiedler et al. | 385/7 |
| 5,872,648 A | 2/1999 | Sanchez et al. | 359/290 |
| 5,905,587 A | 5/1999 | Maeno et al. | 398/45 |
| 5,923,798 A | 7/1999 | Aksyuk et al. | 385/19 |
| 5,943,453 A | 8/1999 | Hodgson | 385/16 |
| 5,948,600 A | 9/1999 | Roschger et al. | 430/348 |
| 5,959,749 A | 9/1999 | Danagher et al. | 398/83 |
| 5,960,133 A | 9/1999 | Tomlinson | 385/18 |
| 5,970,185 A | 10/1999 | Baker et al. | 385/3 |
| 6,171,766 B1 | 1/2001 | Patel et al. | 430/339 |
| 6,172,795 B1 * | 1/2001 | Carlston | 359/290 |
| 6,198,856 B1 * | 3/2001 | Schroeder et al. | 385/17 |
| 6,381,059 B1 * | 4/2002 | Carlson | 359/244 |
| 6,424,759 B1 * | 7/2002 | Jing | 385/17 |
| 6,516,108 B1 * | 2/2003 | Zuras et al. | 385/17 |
| 6,606,428 B2 * | 8/2003 | Goldstein et al. | 385/18 |
| 2001/0038732 A1 | 11/2001 | Carlson | 385/19 |
| 2002/0141029 A1 * | 10/2002 | Carlson et al. | 359/244 |

* cited by examiner

OPTICAL SHUTTER ASSEMBLY

RELATED APPLICATIONS

This application is a Divisional of U.S. patent application Ser. No. 09/852,392, filed May 9, 2001 now U.S. Pat. No. 6,583,916, titled "Optical Shutter Assembly, a continuation-in-part of U.S. patent application Ser. No. 09/706,166, filed Nov. 3, 2000 now U.S. Pat. No. 6,381,059, which claims priority to U.S. Provisional Patent Application No. 60/163,349, filed Nov. 3, 1999, both titled "Optical Shutter" to Carlson of the common assignee, the disclosures of which are fully incorporated herein in their entirety for all purposes.

FIELD OF THE INVENTION

The present invention relates generally to the field of optical shutters and switches, and particularly, pertains to optical shutters and switches which operate in the near-infrared and/or visible wavelength regions. More specifically, this invention pertains to optical shutters and switches comprising a reversible transparent-to-reflective optical shutter. This invention also pertains to methods of switching an optical signal from one input path to a selected one of a plurality of different output paths by utilizing the optical shutters and switches of this invention.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optics systems rapidly increases due to the growing demand from Internet usage and other communications, improved all-optical switching systems are of increased interest to overcome the high cost and slow switching speeds of conventional switches. These conventional switches include, for example, various mechanical switches, electro-optic switches, and thermo-optic switches, such as, for example, described in U.S. Pat. Nos. 5,732,168 and 5,828,799, both to Donald. In particular, the increased complexity and cost of switching systems which involve switching from an optical signal to an electrical signal and then back to an optical signal have increased the level of interest in all-optical switches.

An all-optical switch provides switching of an optical signal from one input path to a selected one of a plurality of different output paths without any intermediate conversion of the optical signal to an electrical signal. This is typically accomplished by applying an electrical signal to a switchable element to cause the optical signal to be selectively switched. These electro-optic switches are responsive to the electrical signal to selectively switch the light of the optical signal from the input path to the selected one of the output paths.

A variety of approaches are known for making all-optical or hybrid optical switches, such as, for example, described in U.S. Pat. Nos. 5,905,587 to Maeno, et al.; 5,923,798 to Aksyuk, et al.; 5,970,185 to Baker, et al.; 5,841,912 to Mueller-Fiedler, et al.; 5,091,984 to Kobayashi, et al.; 5,406,407 to Wolff; 5,740,287 to Scalora, et al.; 5,960,133 to Tomlinson; 5,539,100 to Wasielewski et al.; and 5,943,453 to Hodgson.

The need for improved optical switches is increased by the use of wavelength multiplexing which converts the optical signal in the optical fiber into, for example, 16 signals at 16 different wavelengths in a near-infrared range of about 1540 to 1560 nm, as, for example, described in *Bell Labs Technical Journal*, January–March 1999, pages 207 to 229, and references therein, by Giles et al.; and in U.S. Pat. No. 5,959,749 to Danagher et al. The primary function of the optical switch is to add and/or drop optical signals from the multiple wavelengths traveling through the optical fiber. It would be highly desirable to have arrays of optical switches to handle the optical signals from multiple wavelengths per optical fiber and from multiple optical fibers, such as up to 100×100 or greater optical switch arrays. Also, it would be highly desirable if the response time for the optical switch is ultrafast, such as 1 nanosecond or less.

It would be advantageous if an all-optical switching system were available which avoided the complexity and cost of hybrid electro-optic and other switching systems while increasing the speed of the switching times from the millisecond range to the nanosecond or picosecond ranges.

SUMMARY OF THE INVENTION

One aspect of the present invention pertains to an optical shutter comprising an organic free radical compound in which the free radical compound is characterized by forming an oxidized or reduced product having a change in absorption in a near-infrared wavelength region as a result of a photo-induced electron transfer reaction of the free radical compound, wherein the change in absorption is reversible. In one embodiment, the reversible change in absorption is induced by heat. In one embodiment, the reversible change in absorption is induced by radiation selected from the group consisting of ultraviolet radiation, visible radiation, and infrared radiation; and, preferably, the reversible change in absorption is further induced by the presence of oxygen.

In one embodiment of the optical shutter of this invention, the optical shutter further comprises a metallized layer on at least one side of a photon-absorbing layer comprising the free radical compound of the optical shutter. In one embodiment, the metallized layer comprises aluminum.

Another aspect of the present invention pertains to an optical shutter comprising an organic free radical compound, preferably a radical cation compound or a radical anion compound, in which the free radical compound is characterized by forming an oxidized or a reduced product having a change in absorption in a visible and/or a near-infrared region as a result of a photo-induced electron transfer reaction of the free radical compound, wherein the change in absorption is reversible. In one embodiment, the optical shutter is utilized in an optical switch device for a fiber optics communications channel.

Still another aspect of this invention pertains to an optical shutter imageable by photons and having a first state of a low absorption and low reflection at a wavelength and a second state of a high absorption and high reflection at the wavelength, which shutter comprises a photon-absorbing layer, wherein the photon-absorbing layer comprises an organic free radical compound, as described herein, and the photon-absorbing layer is characterized by absorption of the photons by the free radical compound to form a reaction product having a change in absorption at the wavelength and by a reverse reaction of the reaction product to regenerate the free radical compound; and wherein the shutter is characterized by being reversibly imageable between the first and second states. The unique properties of the optical shutter of the present invention may be utilized to prepare a wide variety of extremely compact, picosecond speed optical devices including, but not limited to, optical switches in various arrays comprising one or more of the optical shutters.

Another aspect of the present invention relates to an optical shutter having a first state of transparency and of a low reflectivity at a range of wavelengths and a second state of opacity and of a high reflectivity at the range of wavelengths, which shutter comprises a photon-absorbing layer and a surface layer on at least one side of said photon-absorbing layer, wherein the photon-absorbing layer comprises an organic free radical compound in at least one of the first and second states and is characterized by absorption of photons to form a reaction product having a change in absorption at the range of wavelengths; and wherein the shutter is characterized by being reversibly imageable between the first and second states. In one embodiment, the optical shutter comprises a metallized layer on at least one side of said photon-absorbing layer. In one embodiment, the metallized layer comprises aluminum. In one embodiment, the absorption of photons images the shutter from the first state to the second state, and preferably, wherein the reaction product is the free radical compound. In one embodiment, the absorption of photons images the shutter from the second state to the first state, and preferably, wherein the reaction product is formed from the free radical compound. In one embodiment, absorption of photons reversibly images the shutter between the first and second state.

In one embodiment of the optical shutter of this invention, the free radical compound is a salt of an aminium radical cation. In a preferred embodiment, the free radical compound is a salt of a tetrakis[4-(dialkylamino)phenyl]-1,4-benzenediamine radical cation. In more preferred embodiment, the free radical compound is a salt of a N,N-dialkyl-N',N'-bis[4-(dialkylamino)phenyl]-1,4-benzenediamine radical cation. In one embodiment, the free radical compound is a salt of an anthrasemiquinone radical anion.

In one embodiment of the optical shutter of the present invention, the wavelength range of photons imaging the shutter from the first state to the second state is different from the wavelength range of photons imaging the shutter from the second state to the first state. In one embodiment, the range of wavelengths where the change in absorption occurs is from 400 to 2000 nm.

Still another aspect of this invention pertains to an optical shutter having a first state of transparency and of low reflectivity at a range of wavelengths and a second state of opacity and of high reflectivity at the range of wavelengths, the shutter comprising a first surface layer in a transparent state, a second surface layer in a transparent state, and a photon-absorbing layer in a transparent state and interposed between the first and second surface layers, wherein the optical shutter is characterized by the absorption of photons to change at least one of the first and second surface layers to a state of high reflectivity and to change the photon-absorbing layer to a state of opacity; and wherein the shutter is characterized by being reversibly imageable between the first and second states. In one embodiment, the optical shutter is characterized by the absorption of photons to change both of the first and second surface layers to a state of high reflectivity. In one embodiment, the changes in reflectivity of the first and second surface layers occur reversibly at the same time. In one embodiment, the optical shutter comprises a metallized layer on at least one side of the photon-absorbing layer. In one embodiment, the metallized layer comprises aluminum.

In one embodiment of the optical shutter of this invention, the reversible imaging from the second state to the first state occurs with no external energy. In one embodiment, the reversible imaging from the second state to the first state is induced by heat. In one embodiment, the reversible imaging from the second state to the first state is induced by absorption of photons from one or more wavelength ranges selected from the group consisting of ultraviolet wavelength ranges, visible wavelength ranges, and infrared wavelength ranges.

Another aspect of the present invention pertains to an optical switch device comprising one or more optical input paths, two or more optical output paths, and one or more optical shutters, as described herein, the one or more shutters having a first state of transparency and of low reflectivity at a range of wavelengths and a second state of opacity and of high reflectivity at the range of wavelengths, and at least one of the one or more shutters comprises a photon-absorbing layer and a surface layer on at least one side of the photon-absorbing layer, wherein the photon-absorbing layer comprises an organic free radical compound and is characterized by absorption of photons to form a reaction product having a change in absorption at the range of wavelengths; and wherein the at least one of the one or more shutters comprising the photon-absorbing and surface layers is characterized by being reversibly imageable between the first and second states; and wherein the switch device is characterized by being capable of switching an optical signal entering the switch device from one of the one or more input paths to a selected one of the two or more output paths. In one embodiment, the switch device further comprises an optical wavelength conversion element to convert the optical signal having a first wavelength to an optical signal of a second different wavelength. In one embodiment, the optical wavelength conversion element comprises an organic free radical compound as an active material for converting the wavelength of the optical signal having the first wavelength.

Still another aspect of this invention pertains to an optical switch device comprising one or more optical input paths, two or more optical output paths, and one or more optical shutters, the one or more shutters having a first state of transparency and of low reflectivity at a range of wavelengths and a second state of opacity and of high reflectivity at the range of wavelengths, and at least one of the one or more shutters comprising a first surface layer in a transparent state, a second surface layer in a transparent state, and a photon-absorbing layer in a transparent state and interposed between the first and second surface layers, wherein the at least one of the one or more optical shutters, as described herein, that comprise the photon-absorbing and surface layers, is characterized by absorption of photons to change at least one of the first and second surface layers to a state of high reflectivity and to change the photon-absorbing layer to a state of opacity, and further is characterized by being reversibly imageable between the first and second states; and wherein the switch device is characterized by being capable of switching an optical signal entering the switch device from one of the one or more input paths to a selected one of the two or more output paths. In one embodiment, the at least one of the one or more optical shutters comprising the photon-absorbing and surface layers comprises a metallized layer on at least one side of the photon-absorbing layer. In one embodiment, the metallized layer comprises aluminum. In one embodiment, the photon-absorbing layer comprises an organic free radical compound and is characterized by an absorption of photons to form a reaction product having a change in absorption at the range of wavelengths.

In one embodiment of the optical switch device of the present invention, optical signals in the one or more input paths and the two or more output paths are bi-directional, and the switch device is characterized by the ability to switch optical signals traveling in opposite directions through the switch device. In one embodiment, the switch device comprises one or more external energy source elements to provide energy to switch the optical shutter comprising the photon-absorbing and surface layers, wherein the one or more external energy source elements are selected from the group consisting of electrical current source elements, heating source elements, ultraviolet light source elements, visible light source elements, and infrared radiation source elements. In one embodiment, the one or more external source elements are connected to an optical switch control circuit device that monitors the desired timing for providing the energy and delivers a signal to the one or more external sources of energy to provide the energy to the at least one of the one or more optical shutters comprising the photon-absorbing and surface layers.

In one embodiment of the optical switch device of this invention, the optical signal is traveling in free space in the one or more input paths and in the two or more output paths immediately prior to and immediately after the optical signal reaches the at least one of the one or more optical shutters comprising the photon-absorbing and surface layers. In one embodiment, the switch device comprises a lens in the two or more output paths to focus the optical signal. In one embodiment, the optical signal is traveling in a waveguide in the one or more input paths and in the two or more output paths immediately prior to and immediately after the optical signal reaches the at least one of the one or more optical shutters comprising the photon-absorbing and surface layers. In one embodiment, the waveguide in the two or more output paths is tapered from a larger dimension in contact to at least one of the first and second surface layers to a smaller dimension at a distance from the at least one of the first and second surface layers.

Another aspect of the present invention pertain to an optical cross-bar switch device, comprising (a) an array of optical shutters arranged in a plurality of columns and rows, each optical shutter having a first state of transparency and of low reflectivity in a range of wavelengths and a second state of opacity and of high reflectivity in the range of wavelengths, the shutter comprising a first surface layer in a transparent state, a second surface layer in a transparent state, and a photon-absorbing layer in a transparent state and interposed between the first and second layers, wherein the optical shutter is characterized by the absorption of photons to change at least one of the first and second surface layers to a state of high reflectivity and to change the photon-absorbing layer to a state of opacity; wherein the optical shutter is characterized by being reversibly imageable between the first and second states; and (b) a plurality of fiber optic ports, each fiber optic port disposed at a respective one of the columns and rows and capable of emitting and receiving a light beam so that when the light beam from a light emitting fiber optic port located at a selected one of the columns and rows is transmitted to a selected light receiving fiber optic port located at a selected remaining one of the columns and rows, the optical shutter located at an intersection formed by the selected column and row is switched to change from the non-reflective state to the reflective state to reflect the light beam from the light emitting fiber optic port to the selected light receiving fiber optic port. In one embodiment, the switch device further comprises a plurality of collimator elements, each collimator element being disposed adjacent to respective ones of each fiber optic port and between each fiber optic port and the optical shutters. In one embodiment, when the optical shutter located at the intersection formed by the selected column and row is in said second state, remaining ones of the optical shutters located in the selected column and row are in said first state. In one embodiment, a plurality of light beams from a plurality of light emitting fiber optic ports located at selected ones of the columns and rows are transmitted to a plurality of selected light receiving fiber optic ports located at selected remaining ones of the rows and columns through a plurality of optical shutters located at respective intersections formed by the selected columns and rows in the respective reflective states.

Still another aspect of this invention pertains to a method for switching an optical signal from one optical input path to a predetermined one of a plurality of different optical output paths, which method comprises the steps of (a) providing a free-space optical switch device, comprising an optical shutter disposed between an optical input path and a first and second optical output paths, the optical shutter being switchable between a transparent state in which the light from the input path is transmitted through the optical shutter to the first output path, and a reflective state in which the light from the input path is reflected from the optical shutter to the second output path; (b) inputting an optical signal into the input path; and (c) providing photons to switch the optical shutter reversibly between the transparent state and the reflective state in order to selectively direct the optical signal to a predetermined one of the output paths. In one embodiment, the optical shutter comprises a first surface layer in a transparent state, a second surface layer in a transparent state, and a photon-absorbing layer in a transparent state and interposed between the first and second surface layers, wherein the optical shutter is characterized by the absorption of photons to change at least one of the first and second surface layers to a state of high reflectivity and to change the photon-absorbing layer to a state of opacity; and wherein the optical shutter is characterized by being reversibly imageable between the first and second states. In one embodiment, the photon-absorbing layer comprises an organic free radical compound in at least one of the first and second states.

Another aspect of this invention pertains to a method for switching an optical signal from one optical input path to a predetermined one of a plurality of different optical output paths, which method comprises the steps of (a) providing a optical switch device, comprising an optical shutter disposed between an optical input port in a first input waveguide and both a first optical output port in a first waveguide and a second optical output port in a second output waveguide, the optical shutter being switchable between a transparent state in which the light from the input port is transmitted through the optical shutter to said first output port, and a reflective state in which the light from the input port is reflected from said optical shutter to said second output port; (b) inputting an optical signal into the input port; and (c) providing photons to switch the optical shutter reversibly between the transparent state and the reflective state in order to selectively direct the optical signal to a predetermined one of the output ports. In one embodiment, the optical shutter comprises a first surface layer in a transparent state, a second surface layer in a transparent state, and a photon-absorbing layer in a transparent state and interposed between the first and second surface layers, wherein the optical shutter is characterized by the absorption of photons to change at least one of the first and second surface layers to a state of high reflectivity and to change the photon-absorbing layer to a state of opacity; and wherein the optical shutter is characterized by being reversibly imageable between the first and second states. In one embodiment, the photon-absorbing layer comprises an organic free radical compound in at least one of first and second states.

Still another aspect of the present invention pertains to a method for switching an optical signal from one or more optical input paths to a predetermined one of two or more optical output paths, which method comprises the steps of (a) providing an optical switch device, as described herein; (b) inputting an optical signal into the one or more input paths; and (c) providing photons to switch the optical shutter from the first state and the second state in order to selectively direct the optical signal to a predetermined one of the two or more output paths.

As will be appreciated by one of skill in the art, features of one aspect or embodiment of the invention are also applicable to other aspects or embodiments of the invention.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
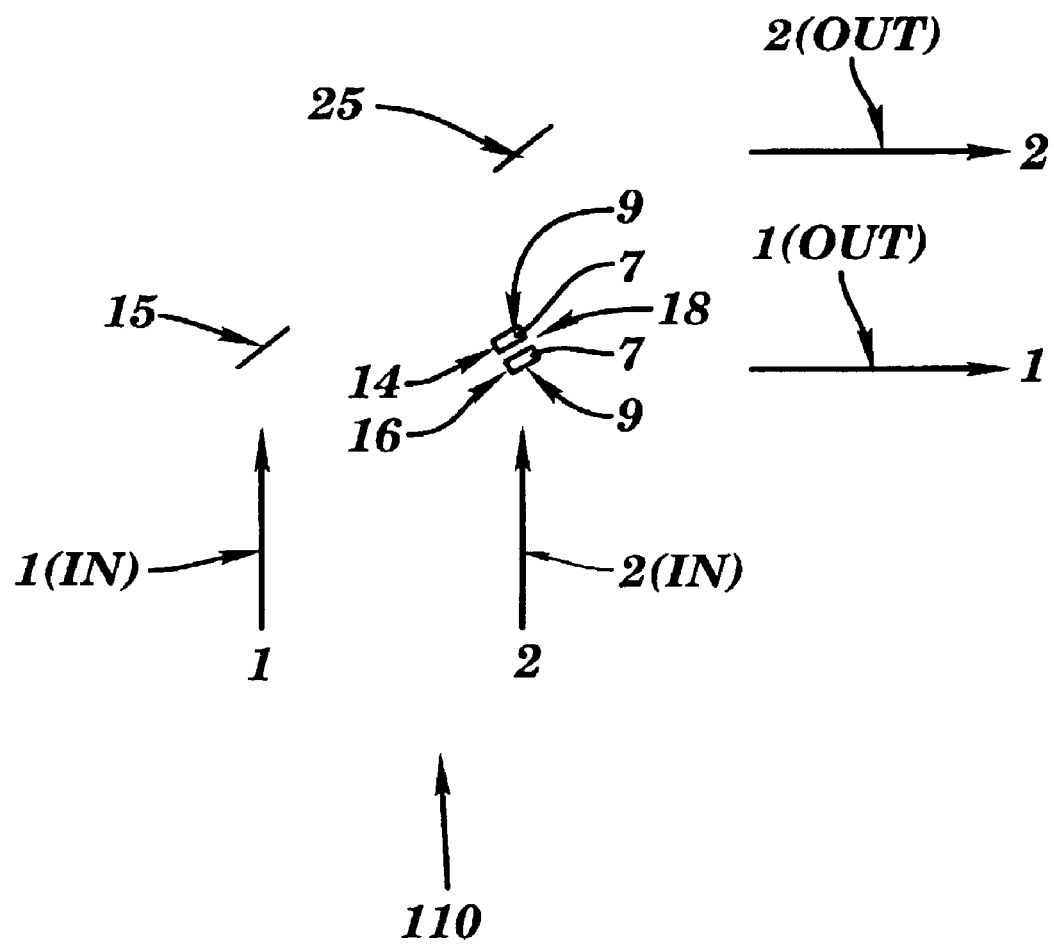
FIG. 1 shows one embodiment of an optical switch device utilizing the optical shutters of the present invention.

The optical shutters and switch devices of the present invention provide superior speed of response, such as a response time of 1000 picoseconds or less, to the incident radiation, and are particularly useful in systems where an all-optical shutter and switching mechanism is desirable.

Organic Free Radical Compounds

The term "organic free radical compounds," as used herein, pertains to organic compounds which comprise at least one free unpaired electron on an atom, such as, for example, a carbon atom, a nitrogen atom, or an oxygen atom, in the ground state of the organic compound. Suitable organic free radical compounds for the optical shutters of the present invention include neutral organic free radicals, salts of organic free radical cations, and salts of organic free radical anions. For purposes of brevity, the terms "organic free radical cation", "organic radical cation", and "radical cation" are used interchangeably herein. The word "cation," as used herein, pertains to a positively charged atom in a molecule, such as, for example, a positively charged nitrogen atom. Similarly, the terms "organic free radical anion", "organic radical anion", and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable organic free radical cations for the optical shutters and switch devices of this invention include, but are not limited to, aminium radical cations, such as, for example, tris (p-dibutylaminophenyl) aminium hexafluoroantimonate, which is commercially available as IR-99, a trademark for a dye available from Glendale Protective Technologies, Inc., Lakeland, Fla. An equivalent chemical name for IR-99, used interchangeably herein, is the hexafluoroantimonate salt of N,N-dibutyl-N',N'-bis[4-dibutylamino)phenyl]-1,4-benzenediamine radical cation. IR-99 is known to be a stable material that may exist in a layer of material, such as in a polymeric coating, under normal room conditions for an extended period of time. Other suitable aminium radical cations with a tris (p-dibutylaminophenyl) aminium salt molecular structure include IR-126 and IR-165, which are trademarks for dyes available from Glendale Protective Technologies, Inc., Lakeland, Fla. These two dyes are likewise known to be stable in the dry powder form and in a layer of material, such as in a polymer-containing coating, under ambient room conditions for extended periods of time, such as many years.

IR-126, which is the hexafluoroantimonate salt of tetrakis [4-(dibutylamino)phenyl]-1,4-benzenediamine radical cation, is particularly preferred for use in the optical shutters and switch devices of this invention because of its very intense and relatively flat absorption across the 1400 to 1700 nm wavelength region typically utilized for optical Internet fiber optic communication channels and because of its one-electron reduction to a very transparent neutral non-free radical compound which has no significant absorption above 500 nm. Also, IR-126 may undergo a one-electron oxidation to IR-165, which has a much lower absorption in the 1500 to 1700 nm wavelength region.

Examples of suitable organic free radical anions for the optical shutters of the present invention include, but are not limited to, anthrasemiquinone radical anions, such as, for example, described in *Photochemistry and Photobiology*, Vol. 17, pages 123–131 (1973) by Carlson and Hercules.

For example, under oxidative or reductive conditions, a light yellow-green layer comprising IR-165 upon laser exposure at 1065 nm may undergo photo-induced electron transfer reactions which compete efficiently with the ultrafast photothermal processes of IR-165 to produce an oxidized product having a change in absorption in both the visible and the near-infrared wavelength regions or, alternatively, to produce a reduced product having a change in absorption in both the visible and the near-infrared wavelength regions. For example, the oxidized product of IR-165 may be a blue compound from a two-electron photo-induced electron transfer reaction, particularly when the layer of IR-165 comprises a polymer, such as nitrocellulose, which promotes oxidation of IR-165 upon exposure to radiation. Similarly, for example, the reduced product of IR-165 may be an intense green compound from an one-electron photo-induced electron transfer reaction, particularly when the layer of IR-165 comprises a polymer which does not promote oxidation of IR-165 upon exposure to radiation. The green, reduced product of IR-165 has new intense absorption peaks at 950 nm and 1480 nm, in comparison to the absorption of IR-165. One of the green, reduced products of IR-165 is IR-126, which is an one-electron reduction product of IR-165. Depending on the other materials present in the layer, these blue oxidized or green reduced compounds may be transient compounds and may revert to the starting IR-165 material at various speeds from less than 0.1 milliseconds to many seconds. A photo-induced reaction may be utilized to accelerate the reversion back to the starting IR-165 material.

Also, for example, layers comprising anthrasemiquinone radical anions, including the many possible substituted and other derivatives of the anthrasemiquinone radical anion, may undergo photo-induced electron transfer reactions which occur very rapidly and compete efficiently with the photothermal processes of these radical anions, to produce a reduced product having a change in absorption in both the visible and the near-infrared wavelength regions. This change in absorption typically includes a loss in absorption in the near-infrared wavelength region due to the conversion of the radical anion to a non-free radical compound, such as, for example, a dianion.

Optical Shutters and Switch Devices

One aspect of the present invention pertains to an optical shutter comprising an organic free radical compound in which the free radical compound is characterized by forming an oxidized or a reduced product having a change in absorption in a visible and/or a near-infrared wavelength region as a result of a photo-induced electron transfer reaction of the free radical compound.

Another aspect of the present invention relates to an optical shutter having a first state of transparency and of a low reflectivity at a range of wavelengths and a second state of opacity and of a high reflectivity at the range of wavelengths, which shutter comprises a photon-absorbing layer and a surface layer on at least one side of said photon-absorbing layer, wherein the photon-absorbing layer comprises an organic free radical compound in at least one of the first and second states and is characterized by absorption of photons to form a reaction product having a change in absorption at the range of wavelengths; and wherein the shutter is characterized by being reversibly imageable between the first and second states.

Still another aspect of this invention pertains to an optical shutter having a first state of transparency and of low reflectivity at a range of wavelengths and a second state of opacity and of high reflectivity at the range of wavelengths, the shutter comprising a first surface layer in a transparent state, a second surface layer in a transparent state, and a photon-absorbing layer in a transparent state and interposed between the first and second surface layers, wherein the optical shutter is characterized by the absorption of photons to change at least one of the first and second surface layers to a state of high reflectivity and to change the photon-absorbing layer to a state of opacity; and wherein the shutter is characterized by being reversibly imageable between the first and second states. In one embodiment, the optical shutter is characterized by the absorption of photons to change both of the first and second surface layers to a state of high reflectivity. In one embodiment, the changes in reflectivity of the first and second surface layers occur reversibly at the same time. In one embodiment, the first and second surface layers are in direct contact to the photon-absorbing layer. In one embodiment, the at least one of the first and second surface layers are not in direct contact to the photon-absorbing layer. In one embodiment, the optical shutter comprises two or more photon-absorbing layers interposed between the first and second surface layers. In one embodiment, the first surface layer is in direct contact to a first one of the two or more photon-absorbing layers and the second surface layer is in direct contact to a second one of the two or more photon-absorbing layers. In one embodiment, the photon-absorbing layer comprises an organic free radical compound and is characterized by an absorption of photons to form a reaction product having a change in absorption at the range of wavelengths, and preferably, the reaction product is the free radical compound. In one embodiment, the absorption of photons images the optical shutter from the second state to the first state, and, preferably, the reaction product is formed from the free radical compound.

The term "near-infrared wavelength region," as used herein, pertains to wavelengths from 700 nm to 2000 nm. The term "visible wavelength region," as used herein, pertains to wavelengths from 400 to 700 nm. In one embodiment, the free radical compound is a radical cation, preferably an aminium radical cation, and most preferably, the radical cation is tris (p-dibutylaminophenyl) aminium hexafluoroantimonate (TAH). In a preferred embodiment, the free radical compound is a salt of a tetrakis[4-(dialkylamino)phenyl]-1,4-benzenediamine radical cation, such as, for example, the hexafluoroantimonate salt of tetrakis[4-(dibutylamino)phenyl]-1,4-benzenediamine radical cation. Besides n-butyl groups, other suitable alkyl groups include any of the alkyl groups, such as, for example, methyl, ethyl, 2-propryl, n-pentyl, and n-hexyl, and combinations thereof. In one embodiment, the free radical compound is a radical anion, preferably an anthrasemiquinone (ASQ) radical anion.

In one embodiment of the optical shutter of the present invention, the optical shutter comprises a metallized layer on at least one side of the photon-absorbing layer, preferably on the side through which the photons enter the photon-absorbing layer to form the reaction product. In one embodiment, the metallized layer comprises aluminum. The metallized layer is typically very transparent, such as an optical density of less than 0.05 at the wavelength of the states of low and high absorptions of the optical shutter. These low absorptions of the metallized layer may be obtained by using extremely thin layers of the metal, such as less than 10 Angstroms in thickness. The metallized layer may be utilized to provide reflectivity at the surface of the optical shutter which is reversibly increased, for example, from less than 1% reflective when the optical shutter is in the first state of low absorption to more than 90% reflective when the optical shutter is in the second state of high absorption, simultaneous with the imaging of photon-absorbing layer of the optical shutter from "transparent" to "opaque" and back to "transparent". This provides an overall reversible switching between transparent and reflective states. Also, the metallized layer may be utilized to provide a heat conduction path to dissipate heat generated during the imaging of the optical shutter by connection to a heat sink, such as a larger volume of a metal. For example, aluminum is known to convert absorbed photons to heat and to conduct heat to adjacent areas at speeds of about 1 picosecond.

In one embodiment, the optical shutter of this invention further comprises a surface layer having a low reflectivity state, such as a 45° reflectivity of less than 1% at the wavelength of the states of low and high absorptions, wherein the optical shutter is characterized by the absorption of the photons by the free radical compound or by another photon-absorbing compound to form a high reflectivity state, such as a 45° reflectivity of more than 90% at the wavelength of the states of low and high absorptions, of the surface layer; and wherein the optical shutter is characterized by being reversibly imageable between the low and high reflectivity states. Preferably, the surface layer is on the side of the photon-absorbing layer through which the photons enter to be absorbed to form the reaction product. In one embodiment, the absorption of the photons images the optical shutter from the first state of low absorption and the low reflectivity state and to the second state of high absorption and the high reflectivity state. In one embodiment, the absorption of photons images the optical shutter from the first state to the second state, and preferably, the reaction product is the free radical compound. In one embodiment, the absorption of photons images the optical shutter from the second state to the first state, and preferably, the reaction product is formed from the free radical compound. In one embodiment, the absorption of photons reversibly images the optical shutter between the first and second states.

Suitable materials for the surface layer include, but are not limited to, metals that melt at a temperature above 25° C. and below 700° C., and preferably below 200° C. The surface layer may include an organic free radical compound selected for efficient photon-to-heat conversion and other organic materials, such as, for example, those that undergo a rapid reversible melt-solidification process that enhances the reversible speed and the percent reflectivity of the high reflectivity state. Also, for example, the surface layer may include a thermochromic compound, such as, for example, a vanadium (IV) oxide that reversibly changes between a transparent state and a reflective and opaque state at about 68° C. A metallized layer on at least one side of the photon-absorbing layer may enhance the efficiency of the reversible imaging.

The optical shutter of the present invention may be utilized in a variety of product applications. In one embodiment, the optical shutter is utilized in an optical switch device for a fiber optics communications channel.

In one embodiment of the optical shutter of the present invention, the change in absorption is greater than 0.1, preferably greater than 0.5, and more preferably greater than 1.5, and most preferably greater than 3.0. These absorption changes are measured in optical density units, as known in the art, where an optical density of 1.0 corresponds to 90% absorption and 10% transmission of the incident wavelength or wavelengths of radiation. Thus, for example, an initial absorption or optical density of the optical shutter of 0.1 at 1546 nm that changes to an absorption or optical density in the optical shutter of 1.6 at 1546 nm would have a change in absorption of 1.6 minus 0.1 or 1.5.

In one embodiment, the range of wavelengths is from 400 to 2000 nm. In one embodiment, the range of wavelengths is from 1000 to 1700 nm. In one embodiment, the range of wavelengths is from 1400 to 1700 nm. In one embodiment, the range of wavelengths is from 1500 to 1700 nm.

In one embodiment, the near-infrared wavelength region of the change in absorption is from 700 to 1000 nm. In one embodiment, the near-infrared wavelength region of the change in absorption is from 1000 to 1400 nm, preferably from 1400 to 1600 nm, more preferably from 1520 to 1580 nm, and most preferably from 1500 to 1700 nm.

In one embodiment of the optical shutter of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds.

In one embodiment of the optical shutter of the present invention, the photo-induced electron transfer reaction is an oxidation of the free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound. The oxidation product of a radical cation may be a diradical dication which may readily undergo reverse electron transfer to regenerate the radical cation. Also, the reduction product of a radical anion may be a dianion which may readily undergo reverse electron transfer to regenerate the radical anion and, in the case of an ASQ radical anion and the corresponding dianion, this could involve the controlled presence of oxygen during the reverse electron transfer process.

In a preferred embodiment of the optical shutter of this invention, the change in absorption is reversible. In one embodiment, the reversible change in absorption is induced by heat. In one embodiment, the reversible change in absorption is induced by radiation selected from the group consisting of ultraviolet radiation, visible radiation, and infrared radiation; and, preferably, the reversible change in absorption is further induced by the presence of oxygen. For example, the ASQ radical anion and the corresponding dianion are both unstable in the presence of oxygen and, in the presence of oxygen, may be oxidized to the corresponding anthraquinone compound, which anthraquinone compound may subsequently be photoreduced or otherwise reduced by known methods to form the corresponding ASQ radical anion. In one embodiment, the reversible change in absorption occurs at less than 50° C. in the absence of radiation or any other external source of energy. In one embodiment, the reversible change in absorption occurs in less than 1 second, preferably occurs in less than 10 milliseconds, more preferably occurs in less than 1 millisecond, and most preferably occurs in less than 0.1 milliseconds.

In one embodiment, the wavelength range of the photons to form the reaction product comprises one or more ultraviolet wavelengths. In one embodiment, the wavelength range of the photons to form the reaction product comprises one or more wavelengths from 400 to 700 nm. In one embodiment, the wavelength range of the photons to form the reaction product comprises one or more wavelengths from 700 to 2000 nm.

In one embodiment of the optical shutter of the present invention, the photo-induced electron transfer reaction is induced by ultraviolet radiation. In one embodiment, the photo-induced electron transfer is induced by visible radiation, and preferably is induced by near-infrared radiation. In one embodiment, the photo-induced electron transfer reaction is induced by absorption of photons by a free radical ground state of the free radical compound. This is particularly important where the excited states of the free radical moiety ground state of the free radical compound can not be efficiently populated by absorption by a non-free radical ground state, such as, for example, by an aromatic moiety ground state, and by its subsequent internal conversion to a lower excited state related to the free radical moiety ground state.

In one embodiment of the optical shutter of this invention, the optical shutter further comprises a metallized layer on at least one side of a photon-absorbing layer comprising the free radical compound of the optical shutter. In one embodiment, the metallized layer comprises aluminum. This metallized layer may serve a variety of functions, such as, for example, reflecting more incident radiation back through the optical shutter, enhancing heat development in the optical shutter, and acting as an enhanced or a reduced reflective element in an optical switch device comprising the optical shutter of this invention.

Still another aspect of this invention pertains to an optical shutter imageable by photons and having a first state of a low absorption at a wavelength and a second state of a high absorption at the wavelength, which shutter comprises a photon-absorbing layer, wherein the photon-absorbing layer comprises an organic free radical compound, as described herein, and the photon-absorbing layer is characterized by absorption of the photons by the free radical compound to form a reaction product having a change in absorption at the wavelength and by a reverse reaction of the reaction product to regenerate the free radical compound; and wherein the shutter is characterized by being reversibly imageable between the first and second states.

A wide variety of organic free radical compounds, such as various neutral free radicals, salts of radical cations, and salts of radical anions, may be utilized in the optical shutters of the present invention. Particular advantages for the use of organic free radical compounds in the optical shutters of this invention include, but are not limited to, their extremely intense infrared absorptions at the desired wavelengths for photon excitation and/or the absorption changes associated with optical shutters; their unique ultra-high speed photon conversions at as fast as sub-picosecond times; their stability to degradation by heat, light, or ambient conditions of moisture and air; their ease of fabrication by, for example, coating or plastic molding; and their non-toxicity.

Their extremely intense absorptions are particularly beneficial in reducing the amount of material that is needed to produce the desired reversible absorption change in the optical shutter and thereby allow the optical shutter to be made on a very miniature scale, such as less than 8 microns for the thickness of the layer of the optical shutter which absorbs the photons and causes the absorption change. This layer may be made much thicker than 8 microns if desired in the fabrication of the optical shutter for use in optical switch devices and other optical components, but the amount of the organic free radical compound used may be kept small since the thicker layers do not need to contain any additional organic free radical compound to maintain the desired level of absorption changes. In one embodiment, the thickness of the photon-absorbing layer is 0.5 to 5000 microns. In one embodiment, the thickness of the photon-absorbing layer is 2 to 100 microns. In one embodiment, the thickness of the photon-absorbing layer is 4 to 25 microns. In one embodiment, the thickness of the photon-absorbing layer is less than 8 microns.

For example, IR-165 and IR-126 are illustrative of one type of the organic free radical compounds for the optical shutters of this invention and may be reversibly formed in a photon-induced one electron transfer reaction, where IR-126 is the one-electron reduction product of IR-165 and, conversely, IR-165 is the one-electron oxidation product of IR-126. IR-165 has an extremely high molar extinction coefficient of about 80,000 liters/mole-cm at 1065 nm where photon excitation may be done and has low molar extinction coefficients of less than about 5,000 liters/mole-cm in the 1530 to 1620 nm range where optical shutters may be utilized in optical switch devices and other optical components in a fiber optics communications channel. IR-126 has a very high molar extinction coefficient of about 40,000 liters/mole-cm in a broad and relatively flat absorption across the 1530 to 1620 nm wavelength range, as well as absorbing at about this same molar extinction coefficient down to about 900 nm and also absorbing out to above 2000 nm.

Assuming that IR-126 is present at about a 25% loading by weight in the photon-absorbing layer of the optical shutter and needs to have an optical density of greater than 3.1 in order to provide greater than 99.9% absorption at the wavelengths in the 1530 to 1620 nm range to obtain the contrast ratio of greater than 30 dB that is desired in an optical shutter in a fiber optics communications channel, the photon-absorbing layer containing IR-126 only needs to be about a minimum of 4 microns thick in the direction that the optical signal travels. Since the optical signals are typically traveling in only one plane of the optical shutter, the dimensions of the optical shutter perpendicularly to this plane may be significantly less or greater than the thickness traveled by the optical signal. For example, in the case where a source of photons is utilized to switch the optical shutter and is provided from a direction above and/or below the plane of the optical shutter traveled by the optical signals, the optical density my be, for example, only about 1.0 with a thickness of the photon-absorbing layer in that direction of about 1.3 microns when the loading of IR-126 is 25% by weight. When the loading of the compound whose absorption is switching in the optical shutter of this invention is increased or decreased, the dimensions of the photon-absorbing layer may be correspondingly decreased or increased. In the case where IR-126 switches by a reversible one-electron reduction to a highly transparent non-free radical amine, the ability to achieve a contrast ratio of greater than about 1000 or about 30 dB is particularly enhanced.

Assuming, for example, a 25% loading of IR-126 in the photon-absorbing layer of the optical shutter of the present invention with about a 4 micron thickness of the photon-absorbing layer in the direction that the optical signals travel and about a 1.3 micron dimension in the perpendicular directions to the optical signal path, one form for the optical shutter would be a cylinder. The optical signals could pass through the cylinder in the direction of the axis of the cylinder, and the source of photons would be directed at the sides of the cylinder. In the optical shutters comprising a surface layer on each side of the photon-absorbing layer in the direction that the optical signals pass, it is advantageous to keep the thickness of the photon-absorbing layer in this optical signal direction as low as possible so that light reflected off both these surface layers in the reflective state may be collected in the optical output path with an efficiency similar to that when the light of an optical signal passes through the optical shutter in its transparent state. To aid in this efficient collection, a variety of light collection elements, such as a focusing lens for an optical shutter in a free space configuration or as a tapered waveguide of greater dimensions next to the reflective surface area in a waveguide configuration, may be utilized with the optical shutters and switch devices of the present invention.

Also, for example, since each optical shutter in this case would contain about $2 \times 10^{-12}$ grams of IR-126, less than 1 microgram of IR-126 would be needed to make approximately 16,000 optical shutters, such as might be utilized in a 1200×1200 optical switch device. Also, for example, due to the extremely small size of the optical shutters, a 1200× 1200 optical switch device could have a volumetric size as small as 0.001 cm$^3$ or even smaller, although a larger size might be selected for ease of fabrication and integration with the source of photons and with other optical components.

While not wishing to be bound by any particular theory, the unique ultra-high speed photon conversions of the organic free radical compounds, such as at sub-picosecond speeds, are thought to be greatly influenced by the unique free radical character of their ground states and perhaps of their excited states. Picosecond and sub-picosecond speeds are particularly useful for optical shutters where, for example, nanosecond optical switching of optical data packets is desired, as known in the art of fiber optics communications channels, and, also for example, where protection of eyes or sensors from radiation is desired in a picosecond or faster speed.

The optical shutter of the present invention may be illustrated in one embodiment by an optical shutter comprising a photon-absorbing layer, wherein the photon-absorbing layer comprises IR-165, an organic radical cation. The thickness of the photon-absorbing layer is 4 microns, and the IR-165 is present at 25 weight percent of the photon-absorbing layer. This optical shutter is imageable by photons, such that, for example, when IR-165 in the photon-absorbing layer absorbs photons of 1065 nm wavelength and the photon-absorbing layer comprises a reductive, electron-donating matrix of polymers, counteranions, and other additives around the aminium radical cation, IR-165 forms a reaction product, such as an one-electron reduction product which is the same as or similar to IR-126 depending on the counteranion. Prior to the absorption of photons, the optical shutter has a state of low absorption, such as an optical density of less than 0.05 due to IR-165, at a wavelength, such as 1620 nm. After the absorption of photons and the formation of the reaction product, the optical shutter has a state of high absorption, such as an optical density of 3.1 due to IR-126 or a similar organic free radical compound, at the wavelength, such as 1620 nm. Subsequently, by a dark reaction at ambient or room temperatures or at temperatures less than 50° C. in the absence of radiation, the reaction product, such as IR-126 or a similar organic free radical compound, undergoes a reverse reaction to regenerate the starting free radical compound, IR-165, and to return the optical shutter to the state of low absorption at the wavelength, such as 1620 nm.

Alternatively, the reverse reaction may be induced by heat, either by heat produced during the imaging process that raises the temperature of the photon-absorbing layer above 50° C. or by the external application of heat from a heat source, such as maintaining the optical shutter in a hot environment at a temperature greater than 50° C. The aminium radical cations are typically stable at temperatures up to 250° C. and are known to be stable under non-thermal equilibrium conditions, such as those experienced in laser ablation imaging, at temperatures up to 600° C.

Also, alternatively, the reverse reaction may be induced by radiation selected from the group consisting of ultraviolet radiation, visible radiation, and infrared radiation. Where the reaction product or other components present in the photon-absorbing layer have oxygen-sensitive reactivities, the presence of a desired level of oxygen in combination with the radiation may be utilized to induce the reverse reaction. In one embodiment, the wavelength of the radiation inducing the reverse reaction is different from the wavelength of the photons absorbed to form the reaction product. In one embodiment of the optical shutters of this invention, the wavelength range of photons imaging the optical shutter from the first state to the second state is different from the wavelength range of photons imaging the optical shutter from the second state to the first state. For example, a photosensitizer, such as an anthraquinone, an ASQ radical anion, or an anthraquinone dianion in the case of a salt of an aminium free radical cation as the free radical compound that switches, may be utilized to sensitize the reverse reaction where the photosensitizer has a strong absorption in the visible region in the wavelength range of about 500 to 700 nm, where the aminium radical cations typically have a very weak absorption. In this case, for example, low cost laser diodes, such as those emitting at 635 nm as used for DVD recording or those emitting at 680 nm as used for magneto-optic disk recording, may be utilized for one of the two different photon-induced reversible switching reactions. For example, a photosensitizer absorbing strongly at 635 nm could be utilized in a photon-absorbing layer comprising IR-126 to cause the photon-induced reduction to its corresponding highly transparent non-free radical amine or, alternatively, to cause the photon-induced oxidation of this amine back to IR-126. Thus, although the mechanism of the reverse reaction may be varied, the optical shutter of this invention is characterized by being reversibly imageable between the first and second states of absorption at the wavelength.

The speed and/or timing of the reverse reaction may be varied over a wide range depending on the requirements of the product application. In one embodiment, the reverse reaction occurs in 1 second to 10 years after the photo-induced formation of the reaction product. In one embodiment, the reverse reaction occurs in less than 1 second. In one embodiment, the reverse reaction occurs in less than 10 milliseconds. In one embodiment, the reverse reaction occurs in less than 1 millisecond. In one embodiment, the reverse reaction occurs in less than 0.1 milliseconds. In one embodiment, the reverse reaction occurs in less than 0.01 nanoseconds or 10 picoseconds, such as in 2 to 3 picoseconds or less. When radiation is used to induce the reverse reaction, the timing of the reverse reaction may be selected depending on the timing of the exposure of the optical shutter to the radiation.

Also, with radiation to induce the reverse reaction, the speed may be as fast as the speeds of forming the reaction product after the absorption of the photons, such as, for example, sub-picosecond speeds. For example, when a reversible photon-induced electron transfer occurs in the optical shutter, the speed of the formation of the reaction product may be sub-picosecond and as low as 40 femtoseconds or less and the speed of a dark or heat-induced reverse reaction of the reaction product to regenerate the starting organic free radical may be as fast as 2 to 3 picoseconds. Since the reversible electron transfer involved in the switching of the optical shutter and switch device of this invention does not require a chemical bond breaking, the speeds of the optical switching may be as fast as the sub-picosecond range. These fast speeds are particularly advantageous for optical shutters for use in nanosecond optical packet switching, as known in the art of fiber optics communications channels.

The wavelengths of the photons absorbed by the photon-absorbing layer to form the reaction product may be selected from a wide variety of wavelengths depending on the absorption spectra of the organic free radical compound and the photon-absorbing layer, the wavelengths available from the source of photons, and any need to avoid using a wavelength that may interfere with the wavelength at which the optical shutter has its states of low and high absorptions and is designed to operate as an "on-off" switch. In one embodiment, the wavelength of the photons is one or more ultraviolet wavelengths. In one embodiment, the wavelength of the photons is one or more wavelengths from 400 to 700 nm. In one embodiment, the wavelength of the photons is one or more wavelengths from 700 to 2000 nm. In a preferred embodiment, the absorption of the photons by the free radical compound is from a free radical ground state of the free radical compound, and more preferably, the wavelength of the photons absorbed by the free radical ground state is one or more wavelengths from 700 to 2000 nm.

A wide variety of sources of the photons to form the reaction product and, when radiation is used to induce the reverse reaction, to regenerate the starting free radical compound, may be utilized. Suitable sources of photons include, but are not limited to, lasers, continuous light sources such as mercury lamps, pulsed light sources such as xenon pulse lamps, and electroluminescent light-emitting diodes (LEDs), as known in the art of high intensity sources of photons. It is preferred to provide the photons in pulses such that suitable light sources include pulsed lasers and other pulsed light sources.

Alternatively, in one embodiment, with lasers and continuous light sources, a first modulator is interposed between the laser or the continuous light source to provide a desired length of imaging time and a desired imagewise area for the imaging of the optical shutter by the photons. Suitable modulators may be any of the variety of light modulators, such as electro-optic modulators, known in the art of light modulators, depending on the requirements for the "on-off" imaging, such as, for example, 1.5 picoseconds "on" of providing photons and 20 nanoseconds "off" or, alternatively, 20 nanoseconds "on" and 1.5 picoseconds "off", of the modulator and of the desired imagewise area, such as, for example, a dot or pixel shape of about 6 microns in diameter or of about 6 microns per edge in a square shape, on the photon-absorbing layer of the optical shutter.

In one embodiment, wherein the reverse reaction is induced by radiation selected from the group consisting of ultraviolet radiation, visible radiation, and infrared radiation, a second modulator may be interposed between the source of the radiation and the optical shutter to provide a desired length of imaging time and a desired imagewise area for the reverse reaction of the optical shutter by the radiation. Suitable modulators for the photon-induced reverse reaction may be any of the variety of light modulators, such as electro-optic modulators, known in the art of light modulators, depending on the requirements for the "on-off" imaging, such as described above for the first modulator, and of the desired imagewise area, such as a dot or pixel shape of about 6 microns in diameter or of about 6 microns per edge in a square shape, on the photon-absorbing layer of the optical shutter. In one embodiment, the wavelength of the photons to form the reaction product is different from the wavelength of the radiation inducing the reverse reaction.

In one embodiment, the source of the photons is an electroluminescent light-emitting device, as known in the art of inorganic and organic electroluminescent LEDs. In one embodiment, the light-emitting device has a plurality of light-emitting pixels having a circumference and an intermittent light emission to provide a desired length of imaging time, such as 1.5 picoseconds of "on" time with 20 nanoseconds of "off" time and a desired imagewise area, such as, for example, a dot or a pixel shape of about 6 microns in diameter or of about 6 microns per edge in a square shape, for the imaging of the optical shutter by the photons. In one embodiment, wherein the reverse reaction is induced by radiation selected from the group consisting of ultraviolet radiation, visible radiation, and infrared radiation, a second electroluminescent light-emitting device with a plurality of light-emitting pixels having a circumference and an intermittent light emission provides a desired length of imaging time, such as 1.5 picoseconds of "on" time and 60 nanoseconds of "off" time, and a desired imagewise area, such as, for example, a dot or a pixel shape of about 6 microns in diameter or of about 6 microns per edge in a square shape, for the reverse reaction of the optical shutter by the radiation. In one embodiment, the wavelength of the photons to form the reaction product is different from the wavelength of the radiation inducing the reverse reaction The organic radical cation may be a variety of salts of an aminium radical cation. The choice of the counteranion for the salt depends on a variety of factors such as, for example, the desired speed of the photo-induced reaction to form the reaction product, the desired speed of the reverse reaction of the reaction product to regenerate the starting organic free radical compound, and the required stability of the photon-absorbing layer against degradation by oxygen, moisture, and the photon exposures and reverse reactions during the operation of the reversible optical shutter.

For example, an anthrasemiquinone radical anion is a type of counteranion to use with an aminium radical cation, such as an IR-165 type aminium radical cation, since the anthrasemiquinone radical anion is an electron-donating material which may participate by being oxidized in the photon-induced reduction of the aminium radical cation and also may participate in the reverse reaction of the reaction product to regenerate the starting aminium radical cation by a simultaneous reverse reduction to reform the anthrasemiquinone radical anion, particularly when the reverse reaction is induced or sensitized by ultraviolet, visible, or infrared radiation absorbed by the oxidation product, such as the corresponding anthraquinone, of the anthrasemiquinone radical anion. By the proper selection of the type of anthrasemiquinone radical anion derivative, the anthrasemiquinone radical anion of the combined aminium radical cation-anthrasemiquinone radical anion salt may be the organic free radical that absorbs the photons to form the reaction product having a change in absorption at the wavelength, and the aminium radical cation may participate in promoting this photon-induced reaction and in promoting the reverse reaction to regenerate the starting anthrasemiquinone radical anion.

The wavelength at which the optical shutter has the states of low and high absorption may be varied depending on the product application by the selection of the organic free radical compound and by the total composition of the photon-absorbing layer. Suitable wavelengths include, but are not limited to, the range of 400 to 2000 nm. The wavelength may be a single wavelength or a range of multiple wavelengths. In one embodiment, the wavelength is a wavelength from 400 to 1000 nm. In one embodiment, the wavelength is a wavelength from 1000 to 1400 nm. In one embodiment, the wavelength is a wavelength from 1400 to 1600 nm, preferably 1520 to 1580 mm and more preferably 1500 to 1700 nm, for applications in fiber optics communications channels. In one embodiment, the wavelength is the range of wavelengths mentioned above, such as 400 to 2000 nm and 1500 to 1700 nm.

The levels of absorption of the states of low and high absorption may be varied depending on the product application by the selection of the type and amount of the free radical compound and by the total composition of the photon-absorbing layer. Typically, the change in absorption at the wavelength is the primary property and may be a range of values from, for example, 0.1 in optical density to greater than 3.0 in optical density, depending on the product application. For example, for a typical application of an optical shutter in an optical switch array in a fiber optics communications channel, the optical density of the low state of absorption at the wavelength, such as 1620 nm, should be as low as possible, such as less than 0.01 or completely transparent, and the optical density of the high state of absorption at the wavelength should be very high, such as 3.1 or greater, when measured through the path of the optical shutter that the optical signals are directed to travel, to provide the contrast ratio of greater than 30 dB or of a factor greater than 1000.

In the example of the optical shutter with a photon-absorbing layer comprising IR-165 described above, the absorption of the photons images the optical shutter from the first state of low absorption to the second state of high absorption. Depending on the requirements for the optical shutter in the specific product application, it is readily possible to modify the photon-absorbing layer so that the absorption of photons images the optical shutter from the second state of high absorption to the first state of low absorption. For example, the photon-absorbing layer may comprise IR-126 or a similar aminium radical cation and the photon-absorbing layer may comprise an oxidative, electron-accepting matrix of polymers, counteranions, and other additives around the aminium radical cation. Upon imaging of this optical shutter by photons, for example, at 980 nm, the IR-126 type aminium radical cation forms a reaction product, such as an one-electron oxidation product that is the same or similar to IR-165. Prior to the absorption of photons, the optical shutter has a state of high absorption, such as an optical density of 3.1 due to the IR-126 or similar organic free radical compound, at a wavelength, such as 1620 nm. After the absorption of photons and the formation of the reaction product, the optical shutter has a state of low absorption, such as an optical density of less than 0.05 due to IR-165 or similar organic free radical compound, at the wavelength, such as 1620 nm. The reverse reaction of the optical shutter, as described heretofore, regenerates the starting free radical compound, a IR-126 type radical cation, and returns the optical shutter to the state of high absorption at the wavelength, such as 1620 nm. Thus, this embodiment of the optical shutter of the present invention is also characterized by being reversibly imageable between the first and second states of absorption at the wavelength.

In one embodiment of the optical shutters of this invention, the reaction product forms in less than 1 nanosecond after the absorption of the photons by the free radical compound, preferably forms in less than 0.1 nanoseconds after the absorption of the photons, more preferably forms in less than 0.01 nanoseconds after the absorption of the photons, and most preferably forms in less than 0.001 nanoseconds after absorption of photons by the free radical compound. The formation of the reaction product at speeds of less than 0.001 nanoseconds or 1 picosecond is particularly advantageous for product applications in fiber optics communications channels where nanosecond optical data packet switching is desired.

Organic free radical compounds, such as aminium radical cations, are particularly suitable for sub-picosecond speeds of forming the reaction product, particularly by an photon-induced electron transfer reaction where no covalent bond breaking is required. The fact that IR-165 has a sub-picosecond conversion of photons to heat in certain types of photon-absorbing layers but still exhibits some reversible formation of IR-126 or a similar compound or, alternatively, some reversible formation of a blue, organic free radical oxidation product, illustrates that the speed of formation of these reaction products is fast enough to compete with the sub-picosecond photon-to-heat conversion. In fact, this may reversibly occur to a significant extent with some heat formation during the reverse reaction during the photon excitation of the IR-165 containing layer when the photon excitation times are long, such as greater than 3 picoseconds, especially since photon-induced electron transfer reactions are known to occur in sub-picosecond times as fast as 40 femtoseconds and to be reversible by dark reactions at speeds as fast as 2 to 3 picoseconds. An organic free radical compound where the excited state is an excited state from the free radical ground state may have a rapid internal conversion from this excited state back to the ground state with a concomitant production of heat in a time scale of as low as 1 picosecond or less. In one example of this, an organic radical cation compound absorbs photons in the presence of a thermochromic compound, converts the absorbed photons to heat in less than 1 nanosecond, and causes a change in absorption due to heat-induced changes in the thermochromic compound, as described in PCT International Publication No. WO 98/54615, titled "Optical Shutter Device" and published Dec. 3, 1998, to Carlson. The present invention utilizes an organic free radical compound which undergoes a photo-induced electron transfer reaction which causes changes in absorption due to the oxidation or the reduction of the free radical compound. This photo-induced electron transfer reaction may occur faster and with higher efficiency than internal conversion of the absorbed photons to heat or, alternatively, may have a similar or slightly lower speed and efficiency than this internal conversion to heat so that both electron transfer and heat formation processes occur. The composition of the photon-absorbing layer may be varied to maximize the efficiency of the formation of the reaction product and to minimize direct photon-to-heat and photon-to-luminescence conversions with a target to approach a quantum efficiency of 100% or 1.0 for the conversion of each photon absorbed to form a molecule of reaction product. This efficiency would be advantageous in reducing the amount of photons which are needed for imaging of the optical shutter. The very intense absorptions of the organic free radicals are advantageous in making photon-absorbing layers with a high optical density at the wavelength of the photons used to form the reaction product, thus providing a high percent absorption of these incident photons.

In one embodiment of the optical shutters of this invention, the reaction product is an oxidation product of the free radical compound, such as, for example, an one-electron oxidation product or a two-electron oxidation product. IR-126 as the free radical compound and IR-165 as the reaction product is an example of the reaction product being an one-electron oxidation product. In one embodiment, the reaction product is a reduction product of the free radical compound, such as, for example, an one-electron reduction product and a two-electron reduction product. IR-165 as the free radical compound and IR-126 as the reaction product is an example of the reaction product being an one-electron reduction product. IR-126 as the free radical compound and its corresponding non-free radical amine as the reaction product are another example of the reaction product being an one-electron reduction product.

In addition to the organic free radical compound, the photon-absorbing layer of the optical shutter of the present invention may comprise other materials to provide mechanical integrity to the layer and to optimize the formation of the reaction product and the reverse reaction to regenerate the starting organic free radical. Suitable materials for the photon-absorbing layer include, but are not limited to, organic polymers such as polycarbonate and cellulosic polymers; inorganic glasses, such as a porous grade of silica glass as known in the art of inorganic glasses; and one or more inorganic xerogel layers, as known in the art of xerogel layers. Because of the small sizes possible for the optical shutter of this invention, organic polymers and inorganic xerogel layers are preferred because, unlike inorganic glasses, they are known to be readily fabricated in layers with thicknesses of less than 8 microns by coating and other deposition processes known in the art of manufacturing layers with thicknesses of 0.1 to 8 microns. The one or more inorganic xerogel layers typically have a nanoporous structure with average pore diameters in the range of 0.5 to 300 nm, which may be utilized advantageously to be filled partly or completely with the organic free radical compound and other materials, such as polymeric materials, electron-accepting compounds, and electron-donating compounds, to provide a nanocomposite photon-absorbing layer.

The organic nature of the organic free radical compounds and of the optical shutter of the present invention are advantageous for ease of fabrication, such as by conventional methods of coating or plastic molding, in comparison to inorganic glass materials typically used in all-optical or hybrid optical shutters and switches. Since only the area of the photon-absorbing layer that receives photons is imaged and acts as an optical shutter, the optical shutter may be made for ease of fabrication and possible extension of its product lifetime with a photon-absorbing layer of greater thickness and surface area than is needed. This excess photon-absorbing layer may be utilized later if the original optical shutter has degraded and a new optical shutter is needed by re-positioning the optical shutter to expose this excess photon-absorbing layer as the optical shutter in the product application.

The unique properties of the optical shutter of the present invention are adapted for use in a variety of optical components for fiber optics communications channels, such as, for example, for an optical switch device, an optical buffer, an optical router, and a tunable optical gain filter.

The optical shutter of the present invention may be utilized in any of the optical switch devices known in the art of fiber optics communications channels where the optical switch devices utilize one or more optical shutters, or optical gates as optical shutters are often referred to in fiber optics applications, that operate by a reversible imaging between states of low and high absorptions, including where there is also simultaneous reversible imaging between states of low and high reflectivity. Each of these types of reversible imaging of optical shutters or optical gates have been described herein for the optical shutter of this invention.

One aspect of the optical switch devices of this invention pertains to an optical switch device comprising one or more optical input paths, two or more optical output paths, and one or more optical shutters, which one or more optical shutters are imageable by photons and have a first state of a low absorption at a wavelength and a second state of a high absorption at the wavelength, at least one of the one or more optical shutters comprising a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein at least one of the one or more shutters is characterized by being reversibly imageable between the first and second states of absorption; and further wherein at least one of the one or more optical shutters further comprise a surface layer having a low reflectivity state at the wavelength, wherein the at least one of the one or more optical shutters is characterized by absorption of the photons to form a surface layer having a high reflectivity state and by a reverse reaction of the high reflectivity state to regenerate the low reflectivity state of the surface layer; and wherein the at least one of the one or more optical shutters is characterized by being reversibly imageable between the low and high reflectivity states; and wherein the optical switch array is characterized by being capable of switching an optical signal of the wavelength entering the switch array from a first optical input path to exiting the switch device in a first or a second optical output path.

Still another aspect of this invention pertains to an optical switch device comprising one or more optical input paths, two or more optical output paths, and one or more optical shutters, the one or more shutters having a first state of transparency and of low reflectivity at a range of wavelengths and a second state of opacity and of high reflectivity at the range of wavelengths, and at least one of the one or more shutters comprising a first surface layer in a transparent state, a second surface layer in a transparent state, and a photon-absorbing layer in a transparent state and interposed between the first and second surface layers, wherein the at least one of the one or more optical shutters, as described herein, that comprise the photon-absorbing and surface layers, is characterized by absorption of photons to change at least one of the first and second surface layers to a state of high reflectivity and to change the photon-absorbing layer to a state of opacity, and further is characterized by being reversibly imageable between the first and second states; and wherein the switch device is characterized by being capable of switching an optical signal entering the switch device from one of the one or more input paths to a selected one of the two or more output paths.

In one embodiment, the at least one of the one or more optical shutters comprising the photon-absorbing and surface layers comprises a metallized layer on at least one side of the photon-absorbing layer. In one embodiment, the metallized layer comprises aluminum. In one embodiment, the photon-absorbing layer comprises an organic free radical compound and is characterized by an absorption of photons to form a reaction product having a change in absorption at the range of wavelengths.

In one embodiment of the optical switch devices of the present invention, the reversible imaging from the second state to the first state occurs with no external source of energy. In one embodiment, the reversible imaging from the second state to the first state is induced by heat. In one embodiment, the reversible imaging from the second state to the first state is induced by absorption of photons from one or more wavelength ranges selected from the group consisting of ultraviolet wavelength ranges, visible wavelength ranges, and infrared wavelength ranges. In one embodiment, the first and second surface layers are in direct contact to the photon-absorbing layer. In one embodiment, the at least one of the first and second surface layers is not in direct contact to the photon-absorbing layer. In one embodiment, the at least one of the one or more shutter comprises two or more photon-absorbing layers interposed between the first and second surface layers. In one embodiment, the first surface layer is in direct contact to a first one of the two or more photon-absorbing layers and the second surface layer is in direct contact to a second one of the two or more photon-absorbing layers.

In one embodiment, the absorption of the photons images the at least one of the one or more optical shutters from the first state of low absorption to the second state of high absorption, thereby insuring that no optical signal is transmitted through the photon-absorbing layer while the optical signal is simultaneously reflected from the surface layer having a high reflectivity state. Referring to FIG. 1, one embodiment of an optical switch device 110 utilizing the optical shutters of this invention having reversible imaging between both low and high absorption states of a photon-absorbing layer and between low and high reflectivity states of a surface layer, is illustrated. A first input path 1 having an input optical signal 1(IN) at the wavelength, such as, for example, 1620 nm, of the specific communication channel directs the input optical signal 1(IN) to a reflective surface 15, such as a mirror. The reflective surface 15 then directs the input optical signal 1(IN) at an optical shutter 14 comprising a surface layer 9 having a low reflectivity state and a photon-absorbing layer 7 comprising an organic free radical compound or other photon-absorbing compound, such as a non-free radical compound that forms an organic free radical compound by an electron transfer. When the photon-absorbing layer 7 of optical shutter 14 absorbs photons from a light source such as a light source above or below the plane of the optical path of the optical signals in FIG. 1, the organic free radical compound or other photon-absorbing compound absorbs the photons and forms a reaction product providing a change from a state of low absorption to a state of high absorption at 1620 nm, such as, for example, a decrease in optical density at 1620 nm from 3.10 to 0.03 in the optical path of the optical switch that the optical signals are directed to travel. Simultaneously the surface layer 9 of optical shutter 14 is imaged from the low reflectivity state to a second state of high reflectivity. While the reaction product is formed and the optical density and the reflectivity at 1620 nm are very high, this optical signal is reflected to a reflective surface 25, such as a mirror. The optical signal is then reflected by reflective surface 25 to a second output path 2 where the optical signal becomes an output optical signal 2(OUT) at 1620 nm. Alternatively, instead of a reflective surface 25, the change in direction of the optical signal may be done by bends in a waveguide carrying the optical signal or by other direction-changing optical components known in the art of fiber optics communications channels. Prior to any absorption of photons by optical shutter 14 or when the reaction product and the surface layer with the high reflectivity state undergo the reverse reaction to regenerate the starting organic free radical compound or other photon-absorbing compound and to regenerate the surface layer with a low reflectivity state, the optical density and the reflectivity at 1620 nm are very low, and the optical signal can pass through optical shutter 14 and optical shutter 16 to output path 1 where the optical signal becomes an output optical signal 1(OUT) at 1620 nm.

Similarly, a second input path 2 having an input optical signal 2(IN) at the wavelength, such as, for example, 1620 nm, of the specific communications channel directs the input optical signal at an optical shutter 16 comprising a surface layer 9 having a low reflectivity state and a photon-absorbing layer 7 comprising an organic free radical compound or other photon-absorbing compound. When the photon-absorbing layer 7 of optical shutter 16 absorbs photons from a light source such as a light source above or below the plane of the optical signals in FIG. 1, the organic free radical compound or other photon-absorbing compound absorbs the photons and forms a reaction product providing a change from a state of low absorption to a state of high absorption at 1620 nm and simultaneously the surface layer 9 of optical shutter 16 is imaged from the low reflectivity state to a second state of high reflectivity. While the reaction product is formed and the optical density and the reflectivity at 1620 nm are very high, this optical signal is reflected to output path 1 where the optical signal becomes an output optical signal 1(OUT) at 1620 nm. Prior to any absorption of photons by optical shutter 16 or when the reaction product and the surface layer with the high reflectivity state undergo the reverse reaction to regenerate the starting organic free radical or other photon-absorbing compound and to regenerate the surface layer with a low reflectivity state, the optical density and the reflectivity at 1620 nm are very low, and the optical signal can pass through optical shutter 16 and optical shutter 14 to the reflective surface 25. The optical signal is then reflected by reflective surface 25 to the second output path 2 where the optical signal becomes an output optical signal 2(OUT) at 1620 nm.

Optical shutter 16 and optical shutter 14 are in close proximity and form an optical shutter in the configuration of a double optical shutter assembly 18, but the light sources to image the optical shutters may be collimated and focused to provide photons that image only a single optical shutter in the optical switch device, such as only imaging optical shutter 16 without imaging optical shutter 14 of double optical shutter assembly 18.

Many variations and combinations of the optical shutters of the present invention with their flexibility to be "transparent-to-opaque" optical shutters, "opaque-to-transparent" optical shutters, "transparent-to-reflective" optical shutters, and "reflective-to-transparent" optical shutters, as described herein, may be utilized in the designs of the optical switch devices of this invention, including use in optical switch devices known in the art where the designs require "transparent-to-opaque" opaque shutters, "opaque-to-transparent" optical shutters, "transparent-to-reflective" optical shutters, and "reflective-to-transparent" optical shutters.

Figure 2:
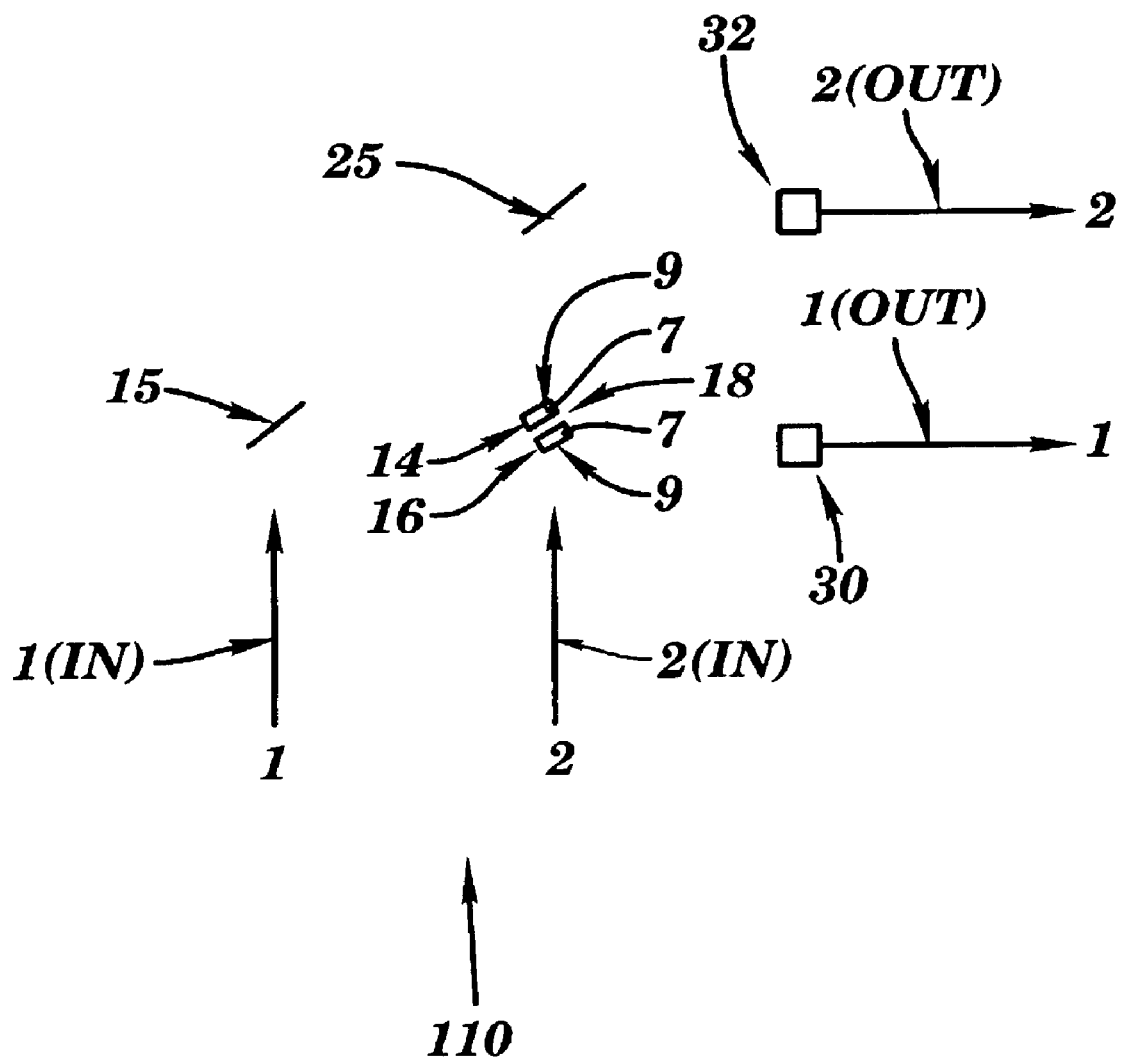
FIG. 2 shows another embodiment of an optical switch device utilizing the optical shutters of this invention and incorporating optical combining devices.

Referring to FIG. 2 where the numbers and words have the same meaning as used for these same symbols in FIG. 1, in another embodiment of the optical switch devices of the present invention, an optical combining device 30 is placed after the double optical shutter assembly 18 to combine and collect the optical signals that have either reflected from fixed mirror 15 or from optical shutter 16, as well as any other optical signals also directed to the combining device 30 at the same time, and to direct these optical signals to output path 1. Similarly, an optical combining device 32 is placed after fixed mirror 25 to combine and collect the optical signals that have reflected from fixed mirror 25 either after passing through double optical shutter assembly 18 in its transparent state or after reflecting off optical shutter 14 of double optical shutter assembly 18 in a reflective state and to direct these signals to output path 2. Optical combining devices, as known in the art of devices for combining optical signals that are on different paths and directions but are in close proximity, are useful with the optical shutter, such as the double optical shutter assemblies, and the optical switch devices of this invention to collect optical signals which may be on slightly different optical paths depending on the switching path being utilized and combining and connecting these optical signals in an efficient manner to the desired output path.

Figure 3:
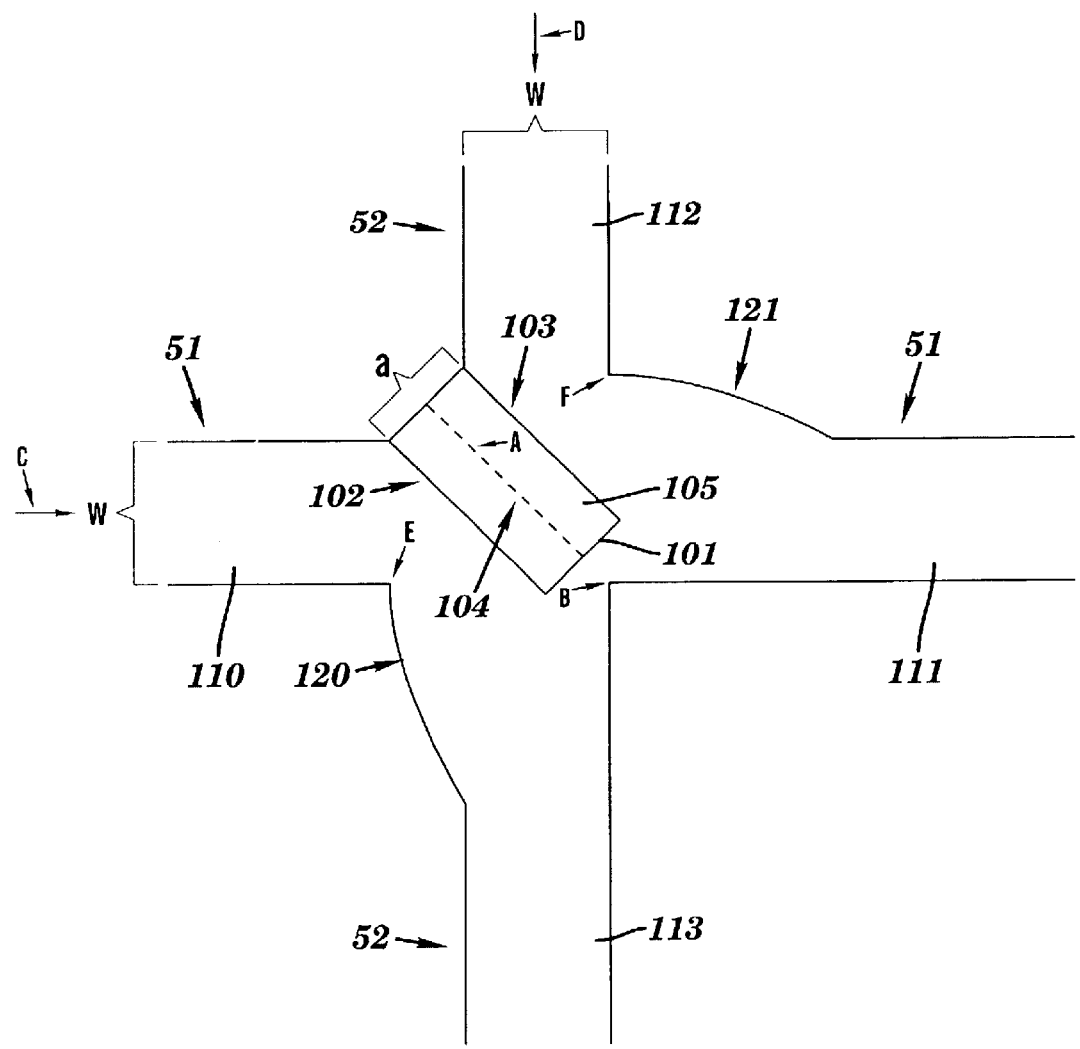
FIG. 3 shows a top down view of one embodiment of the optical shutters of the present invention and utilizing waveguides to transmit the optical signals with tapered waveguides on the optical output paths.

Referring to FIG. 3, in another embodiment of the optical shutters of this invention, the optical shutter 101 has a single photon-absorbing layer 105 interposed between two surface layers 102 and 103. The photon-absorbing layer 105 is in a transparent state when the two surface layers 102 and 103 are in a transparent state to provide the optical shutter 101 in a transparent state. In the reflective state of the optical shutter, the photon-absorbing layer 105 is in an opaque state and the two surfaces 102 and 103 are in a reflective state. As illustrated in FIG. 3, the optical signals are provided to and from the optical shutter 101 through waveguides. Two waveguides 51 and 52, whose internal width where the optical signals are present, is represented by w, intersect at an angle θ with respect to the input paths of the incoming optical signals. In FIG. 3, θ is 90° and in general, 0<θ<180°. The width of the photon-absorbing layer 105 in the optical shutter 101 is denoted as a. The optical shutter 101 is positioned at an angle of θ/2 with respect to the input paths of the incoming optical signals and with its centerline 104 over points A and B of intersection of waveguides 51 and 52.

When the optical shutter 101 is in the transparent state, an optical signal C that is entering the 2×2 optical switch device on the first input path 110 will pass through the optical shutter 101 and exit on the first output path 111. Similarly, an optical signal D that is entering the 2×2 optical switch device on the second input path 112 will pass through the optical shutter 101 and exit on the second output path 113. In contrast, when the optical shutter 101 is in the reflective state, an optical signal C that is entering the 2×2 optical switch device on the first input path 110 will be reflected at surface layer 102 and exit on the second output path 113, and optical signal D that is entering the 2×2 optical switch device on the second input path 112 will be reflected at surface layer 103 and exit on the first output path 111.

Referring to FIG. 3 and considering the state when the optical shutter 101 is in the reflective state on both surfaces, the path of optical signal C when reflected at surface layer 102 into the second output path 113 is shifted relative to the path of optical signal D when the latter exits on the second output path 113 when the optical shutter 101 is in the transparent state. The tapered regions 120 and 121 are useful to efficiently collect the optical signals after they have passed through the optical shutter 101 and to funnel them to a waveguide region of a desired reduced width, such as, for example, the width w of the input waveguides.

A wide variety of shapes are suitable for the tapered region, with FIG. 3 disclosing one alternative. For example, the wider width of the tapered region compared to the width of the input waveguide may be on one side of the output waveguide after the optical signal exits the reflecting surface layer, as for example illustrated in FIG. 3, or it may be divided between both sides of the output waveguide after the optical signal exits the reflecting surface layer, such as, for example, symmetrically divided between both sides. This preferred configuration of the tapered region will be dependent on the position of the optical shutter 101 in the intersection of the two input paths and the two output paths. For example, the minimum width f of the widest width of the tapered region in the section of the output waveguide that is adjacent to the reflective surface layer is the distance between points E and B and equivalently between points B and F in FIG. 3. The minimum width f depends on w, a, and θ by the relationship shown in equation (1):

$$f = w + [a \cdot \cos(\theta/2)] \quad (1)$$

For the sake of simplicity, the energy source that causes the optical shutter to change its state from transparent to reflective or from reflective to transparent in the 2×2 optical switch array of FIG. 3 is not shown. This energy source may be above and/or below the plane of the optical switch device as this plane is illustrated in the top down view of FIG. 3. In one embodiment, the optical signal travels in a waveguide in the one or more input paths and in a selected one of the two or more output paths immediately prior to and immediately after the optical signal reaches the at least one of said one or more shutters comprising the photon-absorbing and surface layers. In one embodiment, the waveguide in the two or more output paths is tapered from a larger dimension in contact to at least one of the first and second surface layers to a smaller dimension at a distance from the at least one of the first and second surface layers.

Figure 4:
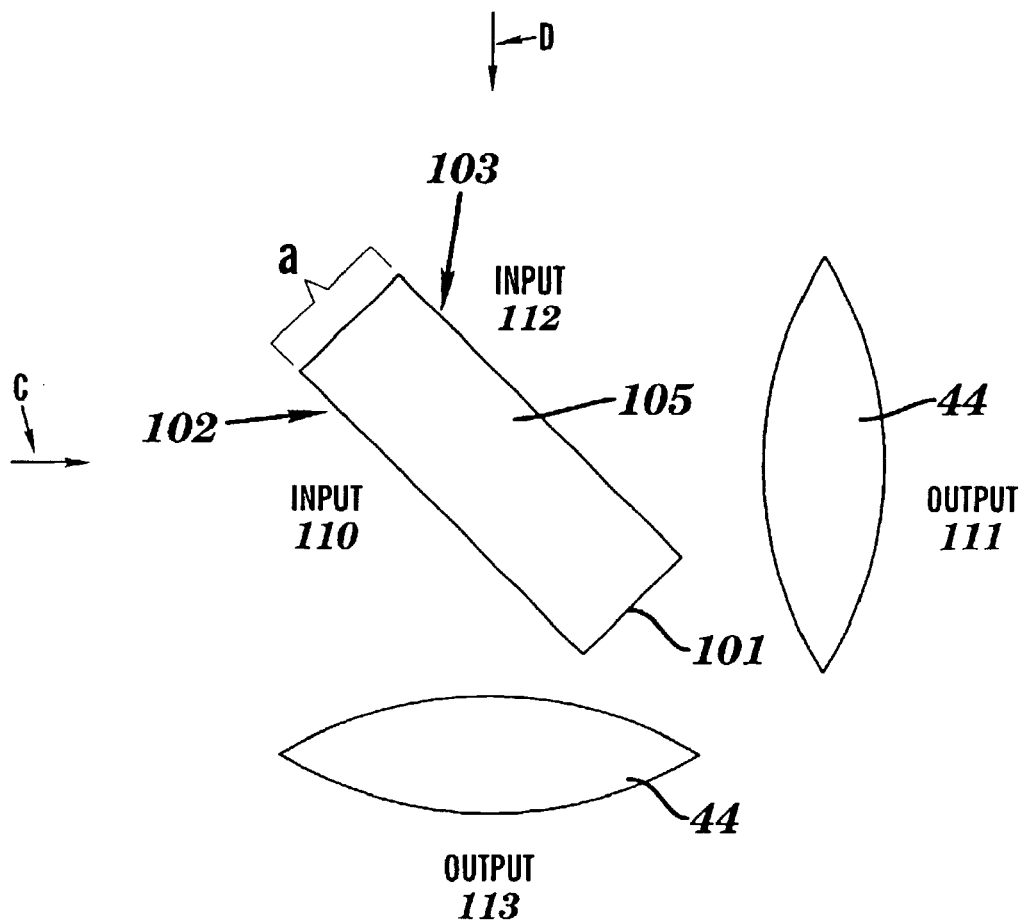
FIG. 4 illustrates a top down view of another embodiment of the optical shutters of this invention and transmitting the optical signals in free space with lenses present in the optical output paths.

Referring to FIG. 4, the numbers and letters have the same meaning as used for these same symbols in FIG. 3. FIG. 4 illustrates one embodiment of a 2×2 optical switch device comprising an optical shutter of the present invention where the optical signals travel into and from the optical shutter in a free space configuration rather than in a waveguide configuration. To efficiently collect the optical signal from the reflective surface layers as well as when the optical shutter is in a transparent state, the tapered regions of the waveguide mode as illustrated in FIG. 3, are replaced with lenses 44 with a suitable curvature to shape and focus the output optical signal to a desired shape. This shape is typically less in size than the shape represented by the optical signals as they would exit the optical shutter in an output path from both the reflective and transparent states. In one embodiment, the optical signal travels in free space in the one or more input paths and in a selected one of the two or more output paths immediately prior to and immediately after the optical signal reaches the at least one of the one or more shutters comprising the photon-absorbing and surface layers. In one embodiment, the switch device comprises a lens in the two or more output paths to focus the optical signal.

Figure 5A:
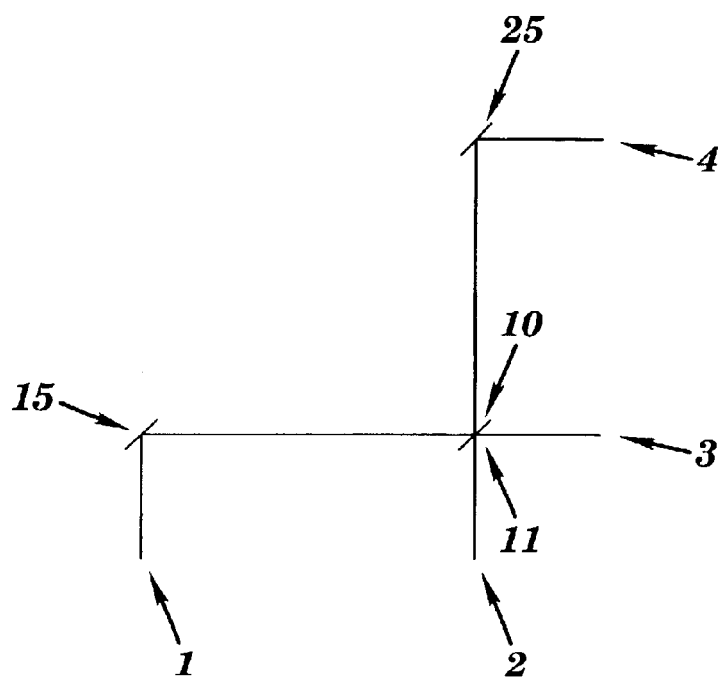
FIG. 5A shows a top down view of one embodiment of the optical switch devices and shutters of the present invention with the optical shutter in the transparent state and having fixed mirrors present to reflect the optical signals in the direction of the optical output paths.
Figure 5B:
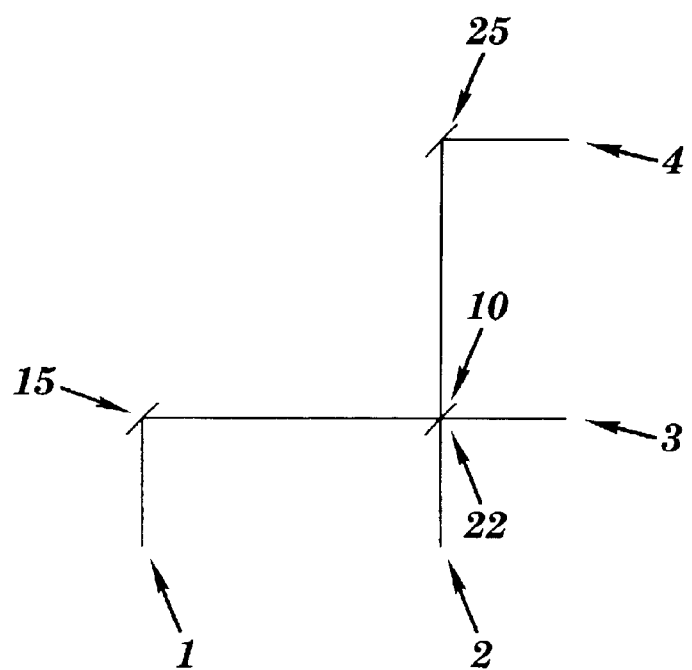
FIG. 5B shows a top down view of one embodiment of the optical switch devices and shutters of the present invention with the optical shutter in the reflective state and having fixed mirrors present to reflect the optical signals in the direction of the optical output paths.

Referring to FIGS. 5A and 5B, one embodiment of a 2×2 optical switch device of the present invention is illustrated. For the sake of simplicity, the optical shutter as illustrated in FIGS. 1 to 4, is illustrated in FIGS. 5A and 5B as a single line and, instead of a waveguide mode or a free space mode, only the path of the input and output optical signals is indicated by lines with arrows on each segment of the line to indicate the paths which could involve either a waveguide mode or a free space mode in the optical shutters and optical switch devices of the present invention.

In FIG. 5A in a top down view, the optical shutter 10 is in the transparent state 11. The optical signal on the first input path 1 reflects from mirror 15 and is directed to pass through the transparent optical shutter 10 and to exit the 2×2 optical switch device on the first output path 3. The optical signal on the second input path 2 passes through the transparent optical shutter 10, reflects from mirror 25, and is directed to exit the 2×2 optical switch device on the second output path 4.

In FIG. 5B in a top down view, the optical shutter 10 is in the reflective state 22. The optical signal on the first input path 1 reflects from mirror 15, is directed to the reflective optical shutter where it is reflected and directed to mirror 25, then reflects from mirror 25, and is directed to exit the 2×2 optical switch device on the second output path 4. The optical signal on the second input path 2 reflects from the reflective optical shutter 10 and is directed to exit the 2×2 optical switch device on the first output path 3.

Figure 6:
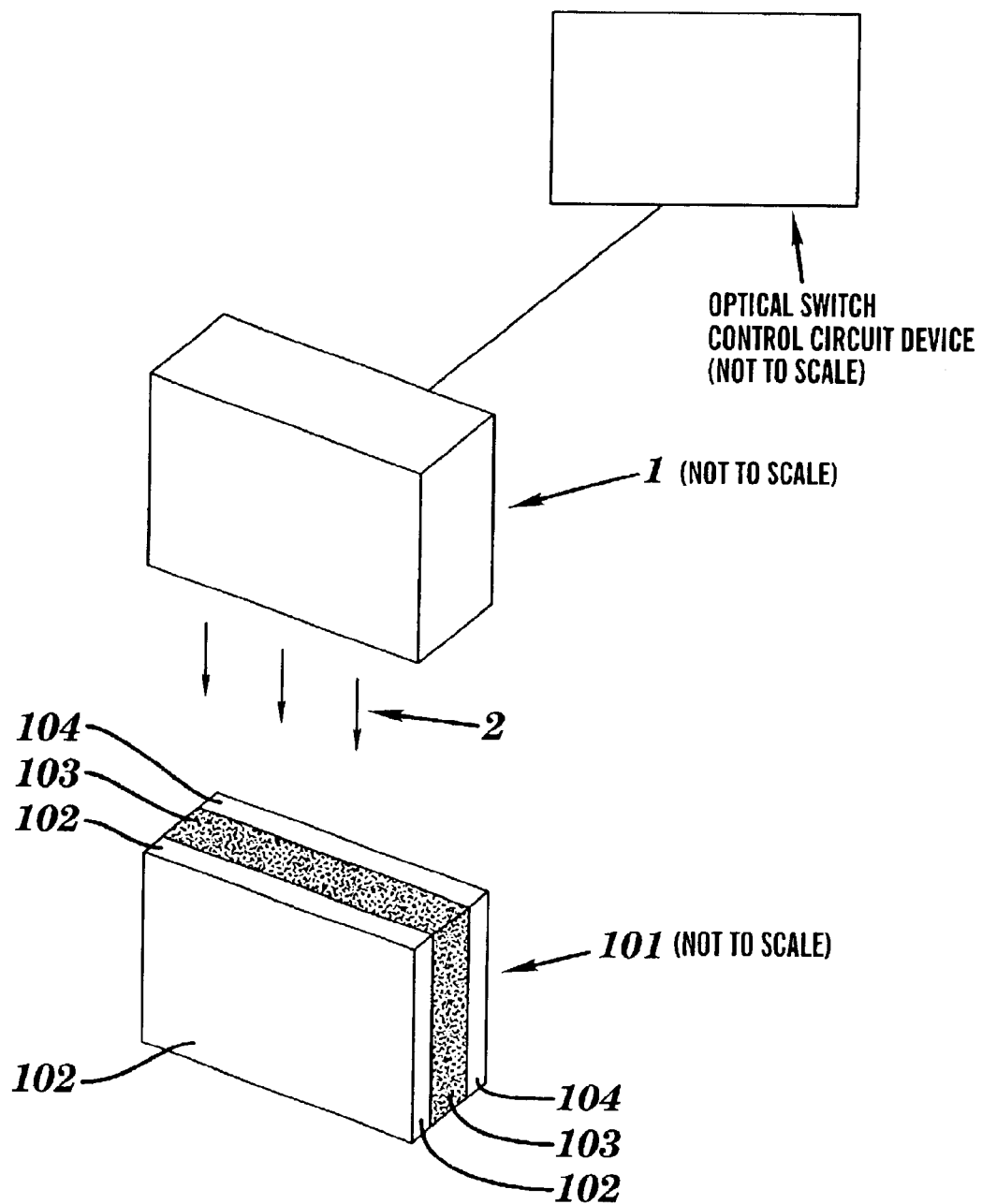
FIG. 6 illustrates one embodiment of the optical shutters of this invention with a source of photons for switching the optical signals when a signal is provided by a optical shutter control circuit device.

Referring to FIG. 6 (not to scale), one embodiment of an energy source in combination with an optical shutter is illustrated for use in the optical shutters and optical switch devices of this invention. An optical shutter 101 (not to scale) is shown in a perspective view from one side. The optical shutter 101 has a first surface layer 102, a second opposite surface layer 104, and a photon-absorbing layer 103 interposed between the two surface layers. Above the optical shutter 101, there is a source 1 of photons 2 which can provide photons of the desired wavelengths and intensities to cause the optical shutter 101 to change from a transparent to a reflective state or from a reflective to a transparent state. Where photons of different wavelengths are desired to reverse the change of the optical shutter, source 1 may be tunable directly or by the indirect use of filters to provide these photons of different wavelengths or, alternatively, a second source of photons may be positioned below or positioned above in a different exposure path to the optical shutter to cause the reverse photon-induced change in the optical shutter. More than one source of photons may be positioned to provide the desired photolytic exposure of the optical shutter for the forward and for the reverse changes of the optical shutter. For the sake of simplicity, lenses, such as, for example, aspheric lenses, and other optical components known in the art of photolytic imaging for focusing a beam of photons on the desired imagewise area, are not shown in FIG. 6. Also, as shown in FIG. 6, an optical switch control circuit device is connected to the source of photons. The optical switch control circuit device monitors the desired timing for providing the photons and delivers a signal to the source of photons to provide the photons to the at least one of the one or more optical shutters comprising the photon-absorbing and surface layers. Instead of photons, suitable sources of energy to switch the optical shutters and switch devices of this invention include, but are not limited to, electrical current source elements and heating sources elements. In one embodiment, the optical switch devices comprises one or more external energy source elements to provide energy to switch the optical shutter comprising the photon-absorbing and surface layers; wherein the one or more external energy source elements are selected from the group consisting of electrical current source elements, heating source elements, ultraviolet source elements, visible light source elements, and infrared radiation source elements. In one embodiment, the one or more external energy source elements are connected to an optical switch control circuit device that monitors the desired timing for providing the energy and delivers a signal to the one or more external sources of energy to provide the energy to the at least one of the one or more optical shutters comprising the photon-absorbing and surface layers.

Figure 7:
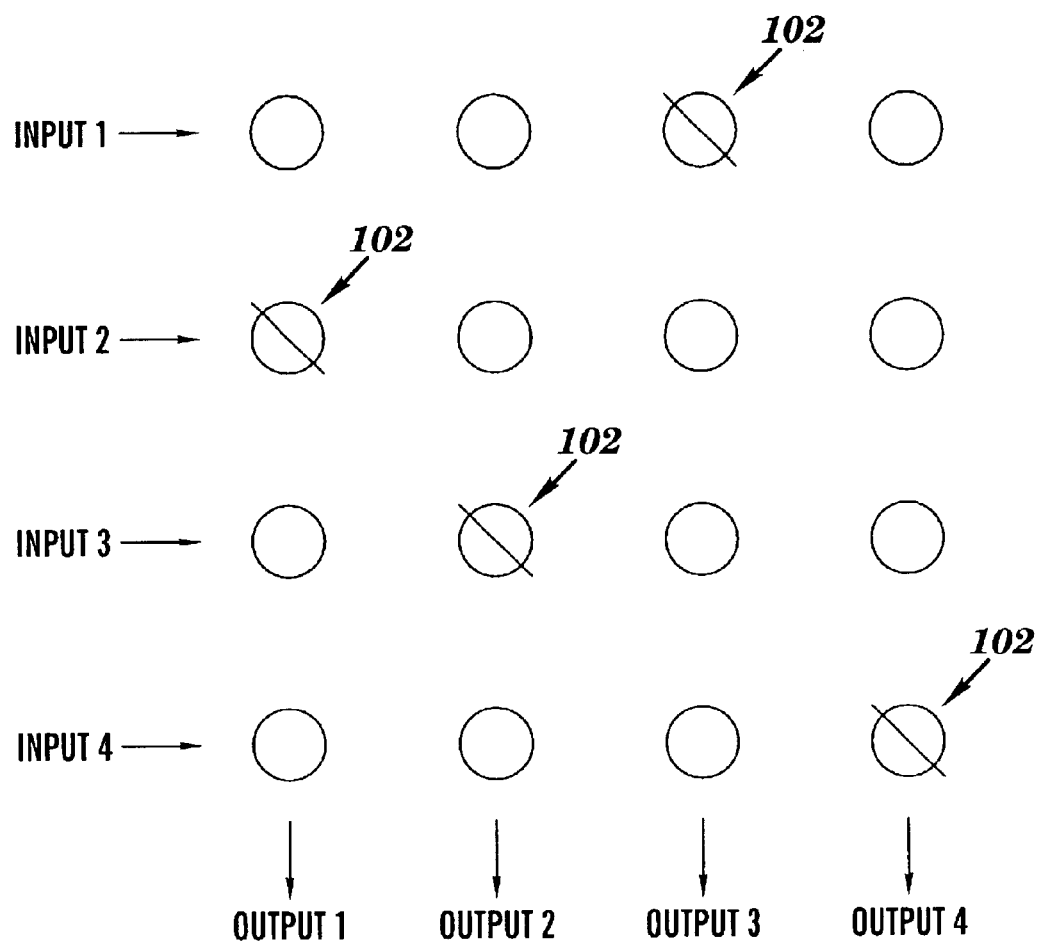
FIG. 7 shows one embodiment of the optical cross-bar switch devices of the present invention.

A wide variety of optical switch device designs are possible utilizing the reversible transparent-to-reflective optical shutters of the present invention. For example, optical switch devices where the number of input paths for the optical signals is represented by M and the number of output paths for the optical signals is represented by N, where M may or may not be equal to N, may be implemented from the interconnection of 2×2 optical switches, as known in the art of M×N optical switch devices and arrays. For example, the cross-bar is a known design wherein the switching component, such as the reversible transparent-to-reflective optical shutters of the present invention, may be arranged in a rectangular array of dimensions M×N. When an optical signal enters on any one of the M input paths, it may exit on any one of the N output paths depending on the state of the optical shutters in the switch device. For example, FIG. 7 illustrates a 4×4 optical cross-bar switch device having 16 optical shutters represented by a circle only for the optical shutters in the transparent state, wherein each optical shutter has a transparent-to-reflective surface positioned at an angle to the input optical signal such that, in the reflective state of the optical shutter, the input optical signal is directed to a specific output path. As an illustration of one possible state of this 4×4 cross-bar, optical shutters 102 are in the reflective state as also indicated by a diagonal line through the circle, and the other 12 optical shutters are in the transparent state. In such a configuration, an optical signal that enters on input path 1 will exit on output path 3. Similarly, optical signals entering on input paths 2, 3, and 4 will exit on output paths 1, 2, and 4, respectively. By changing the state of this 4×4 cross-bar to have other combinations of 4 optical shutters in the reflective state, optical signals on any one of the 4 input paths may exit from any one of the four output paths.

As illustrated, for example, in FIG. 7, one aspect of the present invention pertains to an optical cross-bar switch device, comprising (a) an array of optical shutters arranged in a plurality of columns and rows, each optical shutter having a first state of transparency and of low reflectivity in a range of wavelengths and a second state of opacity and of high reflectivity in the range of wavelengths, the shutter comprising a first surface layer in a transparent state, a second surface layer in a transparent state, and a photon-absorbing layer in a transparent state and interposed between the first and second layers, wherein the optical shutter is characterized by the absorption of photons to change at least one of the first and second surface layers to a state of high reflectivity and to change the photon-absorbing layer to a state of opacity; wherein the optical shutter is characterized by being reversibly imageable between the first and second states; and (b) a plurality of fiber optic ports, each fiber optic port disposed at a respective one of the columns and rows and capable of emitting and receiving a light beam so that when the light beam from a light emitting fiber optic port located at a selected one of the columns and rows is transmitted to a selected light receiving fiber optic port located at a selected remaining one of the columns and rows, the optical shutter located at an intersection formed by the selected column and row is switched to change from the non-reflective state to the reflective state to reflect the light beam from the light emitting fiber optic port to the selected light receiving fiber optic port. In one embodiment, the switch device further comprises a plurality of collimator elements, each collimator element being disposed adjacent to respective ones of each fiber optic port and between each fiber optic port and the optical shutters. In one embodiment, when the optical shutter located at the intersection formed by the selected column and row is in the second state, remaining ones of the optical shutters located in the selected column and row are in the first state, as illustrated, for example, in FIG. 7. In one embodiment, a plurality of light beams from a plurality of light emitting fiber optic ports located at selected ones of the columns and rows are transmitted to a plurality of selected light receiving fiber optic ports located at selected remaining ones of the rows and columns through a plurality of optical shutters located at respective intersections formed by the selected columns and rows in the respective reflective states, as illustrated, for example, in FIG. 7. In one embodiment, when the plurality of rows are oriented parallel to each other, the plurality of columns are oriented parallel to each other, and the plurality of rows and columns are oriented perpendicularly relative to each other, as illustrated, for example, in FIG. 7.

Figure 8:
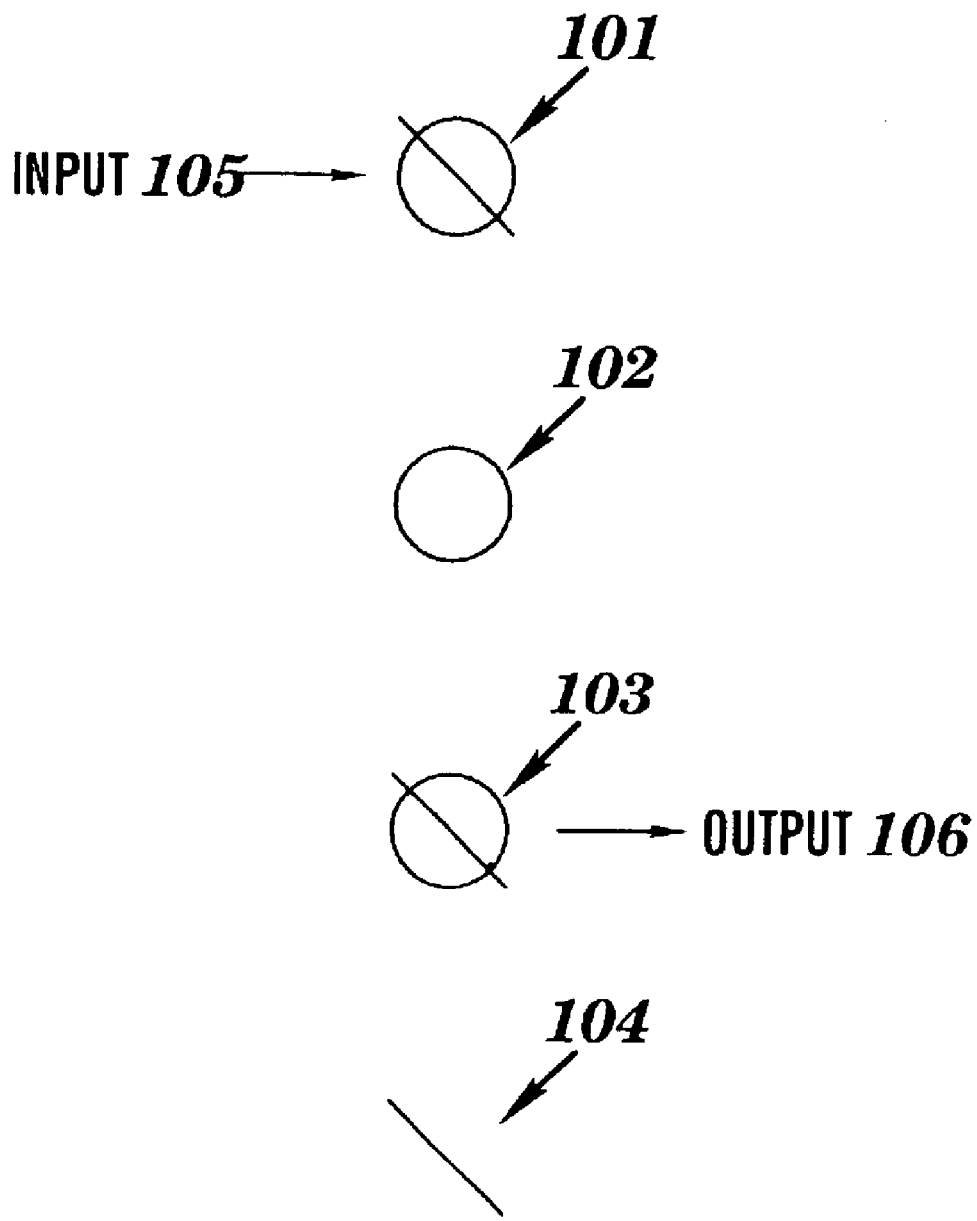
FIG. 8 illustrates another embodiment of the optical switch devices of this invention.

A special case of the cross-bar switch device is the 1×N switch, where a common application is to switch an optical signal to one of N alternate paths, each path having a distinct attribute or function, and then the alternate paths may be recombined at an optical combining device. FIG. 8 illustrates one embodiment of a 1×N switch array where N is four and the output paths for the optical signals are positioned parallel to the input path. The switching function is implemented with three optical shutters, each represented by a circle and having a transparent-to-reflective surface. Optical shutter 101 has its reflective surface layer, as represented by a diagonal line, facing to the lower left side of the figure, while optical shutters 102 and 103 have reflecting surface layers, represented by diagonal lines, facing to the upper right. A permanent reflecting surface 104, such as a mirror, is used so that all four alternate output paths are parallel to one another. For example, an optical signal entering on input path 105 will exit on output path 106 if optical shutters 101 and 103 are in the reflective state and optical shutter 102 is in the transparent state.

The 2×2 optical switch device of FIGS. 1, 2, 5A, and 5 may be readily expanded to larger switch devices, such as, for example, to 1280×1280 optical switch devices where there may be, for example, 16 optical fibers carrying optical signals with each fiber having 80 different wavelengths, such as 80 wavelengths ranging from 1530 to 1620 nm. The "transparent-to-reflective" type of optical shutter illustrated in FIGS. 1, 2, 5A, and 5B with its optical shutter assembly of either two optical shutters in close proximity or a single optical shutter comprising a photon-absorbing layer interposed between two surface layers, may have an overall size as small as, for example, about 8 microns per edge of a cubic shape. If the optical switch device operates by having the 16 incoming fibers of each specific wavelength be demultiplexed and input to the optical switch device in a single plane with the 16 fibers carrying the other 79 specific wavelengths being likewise successively positioned and provided with demultiplexed signals in 79 individual planes parallel and above or below this first plane and further operates by having the optical shutters of each plane is offset enough from the optical shutters of any other plane that the source of light from above or below the 80 planes of the optical switch device may image a single individual optical shutter without imaging any other optical shutters, the optical switch device may have a very compact size. For example, assuming a 8 micron length per edge of a cubic shape for double optical shutter assembly 18 in FIG. 1, the dimensions of a corresponding 1280×1280 optical switch device based on this type of "transparent-to-reflective" optical shutter and double optical shutter assembly may be estimated to be as small as about 8 microns multiplied by 16 fibers or 128 microns in one dimension in a single plane of 16 optical signals, about 8 microns multiplied by 80 wavelengths or 640 microns in depth to account for the total of 80 planes for each of the individual wavelengths, and about 8 microns multiplied by 80 wavelengths and then multiplied by 16 signals or 10,240 microns in the second dimension in each single plane carrying optical signals to account for the offsetting to provide the ability to image only a single optical shutter without imaging any other optical shutters. This extremely small size is very advantageous for cost, ease of manufacturing, and space considerations for both optical switch devices and for the light sources to image the optical switch devices.

Figure 9:
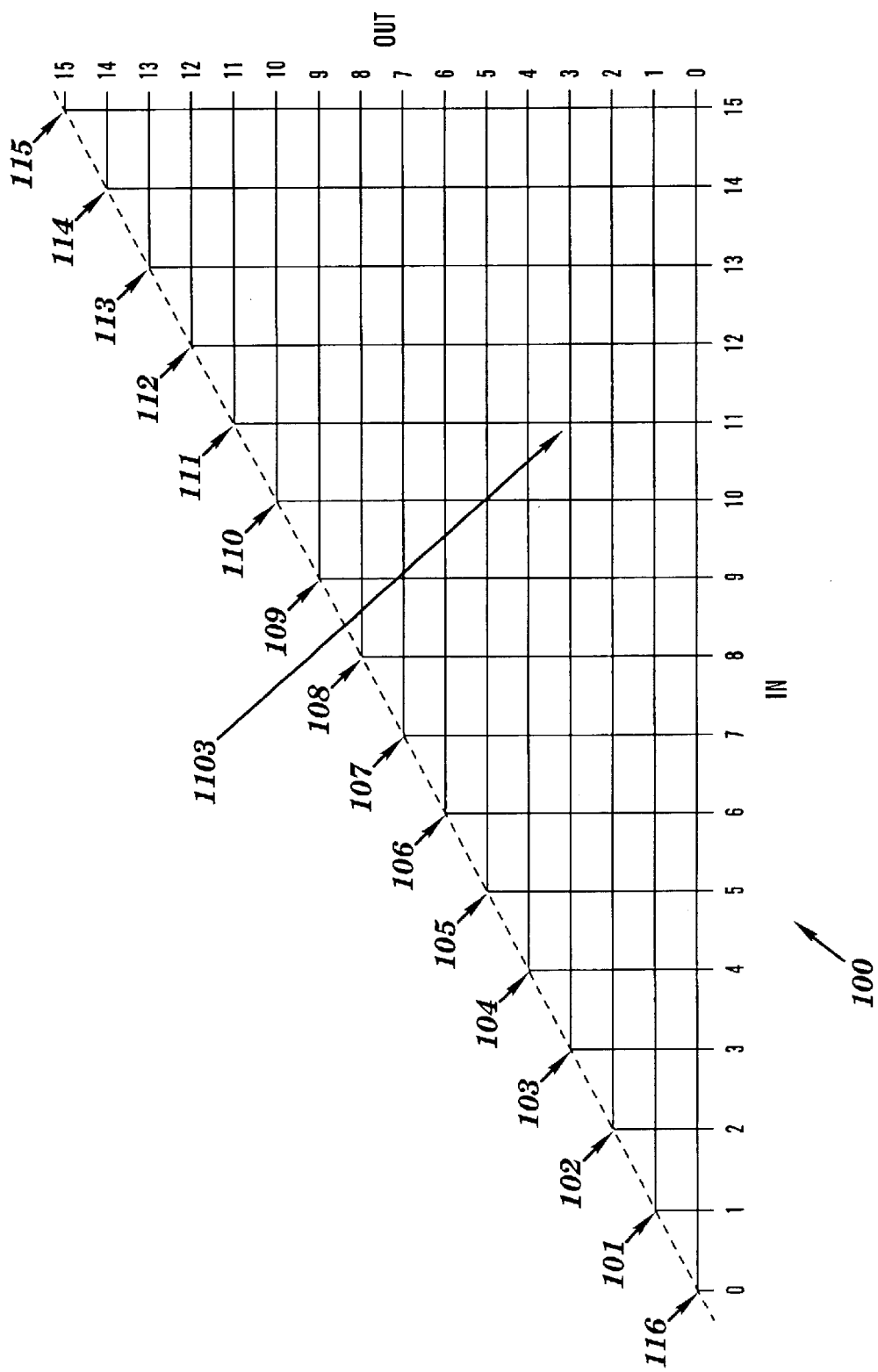
FIG. 9 shows another embodiment of the optical switch devices of the present invention and having fixed mirrors to reflect the optical signals in the direction of the optical output paths.

Referring to FIG. 9, one embodiment of a 16×16 optical switch device 100 of the present invention is illustrated. As described above, this 16×16 optical switch device could be just one plane of a 3-dimensional optical switch device of a larger size, such as up to 1280×1280 and larger M×N devices, where different optical switch devices are on planes parallel to each other and offset relative to the source of photons to switch the optical shutter so that the source of photons from above and/or below the planes carrying the optical signals may expose and switch only specific optical shutters, as desired. FIG. 9 is a top down view that is similar to the smaller optical switch devices shown in FIGS. 1, 2, 5A, and 5B. Input optical signals are represented by the vertical lines just above the numbers 0 through 15 on the bottom side of the optical switch device triangle where it is labeled IN and before any intersections with horizontal lines. Output optical signals are represented by the horizontal lines just to the left of the numbers 0 through 15 on the right side of the optical switch device triangle where it is labeled OUT and before any intersections with vertical lines. The dashed lines 101–116 are reflecting surfaces, such as mirrors. Each intersection of continuous horizontal and vertical lines represents a double optical switch assembly configuration of the optical shutters of the present invention, as described herein. Similar to the functioning as described for FIGS. 1, 2, 5A, and 5B, for example, an optical signal entering on input path 3 may be switched to output path 11 by switching the optical shutter at the intersection 1103 of the vertical line extending from input path 11 and the horizontal line extending from output path 3. This reflects the optical signal at the intersection 1103 to reflecting surface 111, where it is again reflected to exit on output path 11. Similarly, the input optical signals on any one of the input paths may be switched to exit on any one of the output paths.

Since the optical switch devices, such as 2×2 optical switch devices, may be used in conjunction with other components, including other 2×2 optical switch devices, an important feature is the convenient interconnection of the optical components in the case of optical switching devices in both waveguide and free space configurations. The optical switch devices of this invention may have a wide variety of alternative configurations where the input paths and the output paths for the optical signals have various orientations with respect to each other. For example, in FIGS. 1 and 2, the two input paths for the optical signals are parallel to each other, and the two output paths for the optical signals are parallel to each other and at right angles to the input paths. The optical shutters of this invention provide excellent flexibility for alternative orientations of the input and the output paths. For example, if it is desired to position two input optical paths such that when the optical shutter is in the transparent state, the two optical signals cross one another at an angle θ where this angle is determined with respect to the incoming paths, and when the optical shutter is in the reflective state, it is desired that the optical signals switch positions on the output optical paths, this may be obtained if the double optical shutter assembly configuration of the optical shutter is positioned with the reflecting surface on the optical input side at an angle of one half of θ to the input optical path.

Figure 10:
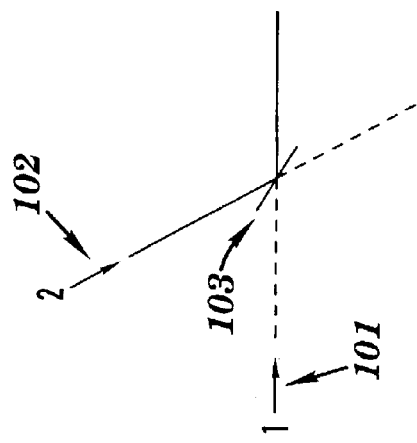
FIG. 10 shows one embodiment of the optical shutters of the present invention in the reflective state with an angle of 30° between the paths of the optical signals and the reflective surfaces of the optical shutters.

For example, referring to FIG. 10 in a top down view similar to that in FIGS. 5A and 5B with the double optical shutter assembly configuration of the optical shutter represented as a single line, the input path 1 for the first optical signal 101 is at an acute angle to the input path 2 for the second optical signal 102. θ in this case is 60° so one half of θ is 30°. For the reflective state of the optical shutter 103, the path taken by the first optical signal 101 is represented by a dashed line, and the path taken by the second optical signal 102 is represented by a solid line. The output paths for both of these optical signals is at an angle of one half of θ or 30° with respect to the plane of the reflecting surfaces of the optical shutter 103.

Figure 11:
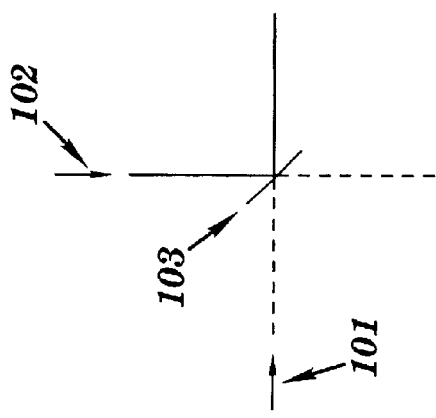
FIG. 11 shows one embodiment of the optical shutters of the present invention in the reflective state with an angle of 45° between the paths of the optical signals and the reflective surfaces of the optical shutters.

FIG. 11 further illustrates the flexibility of the orientation of the input and output optical paths with the optical shutters and switch devices of the present invention. In this case, the input paths for the two optical signals 101 and 102 are at right angles to each other. θ is thus 90°, and one half of θ is 45°. As with FIG. 10, in FIG. 11, for the reflective state of the optical shutter 103, the path taken by the first optical signal 101 is represented by a dashed line, and the path taken by the second optical signal 102 is represented by a solid line. The output paths for both of these optical signals is at an angle of one half of θ or 45° with respect to the plane of the reflecting surfaces of the optical shutter 103.

Figure 12:
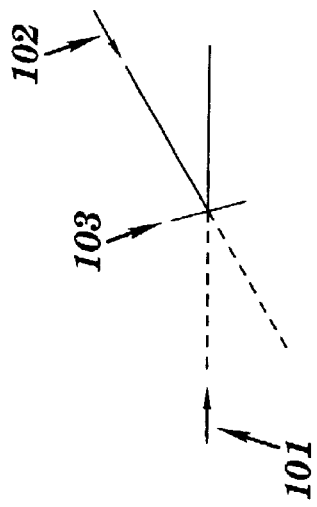
FIG. 12 shows one embodiment of the optical shutters of the present invention in the reflective state with an angle of 75° between the paths of the optical signals and the reflective surfaces of the optical shutters.

FIG. 12 provides another illustration of the flexibility of the orientation of the input and output optical paths with the optical shutters and switch devices of this invention. In this case, the input paths for the two optical signals 101 and 102 are at an angle of 150° to each other, and one half of θ is 75°. As with FIGS. 10 and 11, for the reflective state of the optical shutter 103, the path taken by the first optical signal 101 is represented by a dashed line, and the path taken by the second optical signal 102 is represented by a solid line. Accordingly, the output paths for both of these optical signals is at an angle of one half of θ or 75° with respect to the plane of the reflecting surfaces of the optical shutter 103.

In one embodiment of the optical switch devices of the present invention, the reaction product formed in the photon-absorbing layer is the free radical compound. In one embodiment, the absorption of photons images the at least one of the one or more optical shutters comprising the photon-absorbing and surface layers from the second state to the first state, and preferably, the reaction product is formed from the free radical compound. In one embodiment, the free radical compound is a salt of an aminium radical cation. In a preferred embodiment, the free radical compound is a salt of a tetrakis[4-(dialkylamino)phenyl]-1,4-benzenediamine radical cation. In a preferred embodiment, the free radical compound is a salt of a N,N-dialkyl-N',N'-bis[4-(dialkylamino)phenyl]-1,4-benzenediamine radical cation. In one embodiment, the free radical compound is a salt of an anthrasemiquinone radical anion. In one embodiment, the wavelength range of the photons to form the reaction product comprises one or more ultraviolet wavelengths. In one embodiment, the wavelength range of the photons to form the reaction product comprises one or more wavelengths from 400 to 700 nm. In one embodiment, the wavelength range of the photons to form the reaction product comprises one or more wavelengths from 700 to 2000 nm.

In one embodiment of the optical switch devices of this invention, the reversible imaging between the first and second states is induced by absorption of photons, and wherein the wavelength range of photons imaging the optical shutter from the first state to the second state is different from the wavelength range of photons imaging the optical shutter from the second state to the first state. In one embodiment, the range of wavelengths where the switching goes between the first and second states is from 400 to 2000 nm. In one embodiment, the range of wavelengths is from 1000 to 1700 nm. In one embodiment, the range of wavelengths is from 1400 to 1700 nm. In one embodiment, the range of wavelengths is from 1500 to 1700 nm.

In one embodiment of the optical switch devices of the present invention, an optical combining device is present in at least one of the two or more output paths to direct the optical signal to the selected one of the two or more output paths. In one embodiment, a first fixed mirror is present in the one of the one or more input paths and a second fixed mirror is present in the one of the two or more output paths when the optical signal is switched between the optical input and output paths in the switch device.

In one embodiment of the optical switch devices of this invention, the optical signal is reflected from the at least one of the first and second surfaces at an angle from 10 and 89°, as illustrated, for example, in FIGS. 10, 11, and 12. In one embodiment, the optical signal is reflected from the at least one of the first and second surfaces at an angle of 45°, as illustrated, for example, in FIG. 11.

In one embodiment of the optical switch devices of the present invention, the number of the optical input paths is from 2 to 1280, the number of the optical output paths is from 2 to 1280, and the number of the optical shutters comprising the photon-absorbing and surface layers is from 1 to 9600. In one embodiment, the optical switch device is connected to optical input paths or to optical output paths of one or more other optical switch devices. In one embodiment, the second surface layer is reflective so that a different optical signal can be reflected while the first surface layer is reflecting the optical signal. In this case, for example, the optical shutters of the present invention may also switch optical signals traveling in opposite directions in the same optical input paths and optical output paths. In one embodiment, optical signals in the one or more optical input paths and the two or more optical output paths are bi-directional, and the optical switch device is characterized by the ability to switch the optical signals traveling in opposite directions through the optical switch device.

In one embodiment of the optical shutters and switch devices of this invention, the optical shutters may comprise three or more surface layers in a transparent state and a photon-absorbing layer in a transparent state and interposed between each of the three or more surface layers. For example, the optical shutter could be cubic in shape and have 6 surface layers with the photon-absorbing layer between each of the 6 surface layers or have 3 to 5 only of the sides of the cubic-shaped optical shutter that are surface layers that reversibly image between a transparent state and a reflective state while the photon-absorbing layer reversibly images between a transparent state and an opaque state. These optical shutters and switch devices with three or more transparent-to-reflective surface layers may be useful in certain applications requiring a more complex geometry for the paths of the optical signals.

In one embodiment of the optical switch devices of this invention, the optical switch device further comprises an optical wavelength conversion element to convert the optical signal at the wavelength, such as 1542 nm, to a second different wavelength, such as 1544 nm. This provides additional flexibility in switching the optical signals to other output paths, such as to other available wavelengths in the same or different optical fiber. For example, the addition of one or more optical wavelength conversion elements could convert the eighty 16×16 optical switch devices described in connection with FIG. 9 into a 1280×1280 optical switch device, where any input optical signal may be switched to any one of the 1280 possible output paths for the output optical signals. Preferred are optical wavelength conversion elements which are capable of converting the optical signal to a different wavelength that is one, two, or three wavelengths above or below the wavelength of the input optical signal. Stable organic free radical compounds typically have large molecular structures in order to stabilize the free radical moiety. As such, they typically have large molecular cross-sections, very high absorption extinction coefficients, and often sub-picosecond speed conversions of photons absorbed to heat, to electron transfer reactions, and to luminescence. Accordingly, these organic free radical compounds may be modified to provide non-linear optical properties that alter the frequency of the photons passing through a layer comprising the organic free radical compound and thereby provide a wavelength conversion to the photons. In one embodiment, the optical wavelength conversion layer comprises an organic free radical compound. In one embodiment, the switch device further comprises an optical wavelength conversion element to convert the optical signal having a first wavelength to an optical signal of a second different wavelength. In one embodiment, the optical wavelength conversion element comprises an organic free radical compound as an active material for converting the wavelength of the optical signal having the first wavelength.

Methods of Switching Optical Signals

As described herein, the optical shutters and switch devices of the present invention provide a variety of methods for switching an optical signal from an optical input path to a selected optical output path.

One aspect of this invention pertains to a method for switching an optical signal from one optical input path to a predetermined one of a plurality of different optical output paths, which method comprises the steps of (a) providing a free-space optical switch device, comprising an optical shutter disposed between an optical input path and a first and second optical output paths, the optical shutter being switchable between a transparent state in which the light from the input path is transmitted through the optical shutter to the first output path, and a reflective state in which the light from the input path is reflected from the optical shutter to the second output path; (b) inputting an optical signal into the input path; and (c) providing photons to switch the optical shutter reversibly between the transparent state and the reflective state in order to selectively direct the optical signal to a predetermined one of the output paths. In one embodiment, the optical shutter comprises a first surface layer in a transparent state, a second surface layer in a transparent state, and a photon-absorbing layer in a transparent state and interposed between the first and second surface layers, wherein the optical shutter is characterized by the absorption of photons to change at least one of the first and second surface layers to a state of high reflectivity and to change the photon-absorbing layer to a state of opacity; and wherein the optical shutter is characterized by being reversibly imageable between the first and second states. In one embodiment, the photon-absorbing layer comprises an organic free radical compound in at least one of the first and second states.

Another aspect of this invention pertains to a method for switching an optical signal from one optical input path to a predetermined one of a plurality of different optical output paths, which method comprises the steps of (a) providing a optical switch device, comprising an optical shutter disposed between an optical input port in a first input waveguide and both a first optical output port in a first waveguide and a second optical output port in a second output waveguide, the optical shutter being switchable between a transparent state in which the light from the input port is transmitted through the optical shutter to said first output port, and a reflective state in which the light from the input port is reflected from said optical shutter to said second output port; (b) inputting an optical signal into the input port; and (c) providing photons to switch the optical shutter reversibly between the transparent state and the reflective state in order to selectively direct the optical signal to a predetermined one of the output ports. In one embodiment, the optical shutter comprises a first surface layer in a transparent state, a second surface layer in a transparent state, and a photon-absorbing layer in a transparent state and interposed between the first and second surface layers, wherein the optical shutter is characterized by the absorption of photons to change at least one of the first and second surface layers to a state of high reflectivity and to change the photon-absorbing layer to a state of opacity; and wherein the optical shutter is characterized by being reversibly imageable between the first and second states. In one embodiment, the photon-absorbing layer comprises an organic free radical compound in at least one of first and second states.

Another aspect of the present invention pertains to a method for switching an optical signal from one or more optical input paths to a predetermined one of two or more optical output paths, which method comprises the steps of (a) providing an optical switch device, as described herein; (b) inputting an optical signal into the one or more input paths; and (c) providing photons to switch the optical shutter from the first state and the second state in order to selectively direct the optical signal to a predetermined one of the two or more output paths.

Optical Buffers

The optical shutters of the present invention may be utilized to prepare an optical buffer to store optical signals for a specified delay time before sending the optical signals on to their next destination in the optical network system. As the bit rates and the quantities of optical signals increase, a situation known generally as data contention, as known in the art of fiber optics communication channels, becomes more prevalent. This is especially a technical challenge as the fiber optics communication channels evolve to nanosecond optical burst switching and nanosecond optical packet switching. Data contention involves, for example, two different packets of optical signals being in contention at the same time for transmission to their next destination in the optical network. To resolve this contention, one of the packets of optical signals may be delayed in its transmission, such as, for example, by being placed into a fiber delay line where the speed of light (about 0.3 mm per picosecond) may be used to provide the specified delay time. These fiber delay lines are expensive, complex, space-consuming, and relatively inflexible to making variations in the desired delay time. These disadvantages may be overcome by utilizing the optical shutters of the present invention in an optical buffer.

Figure 13:
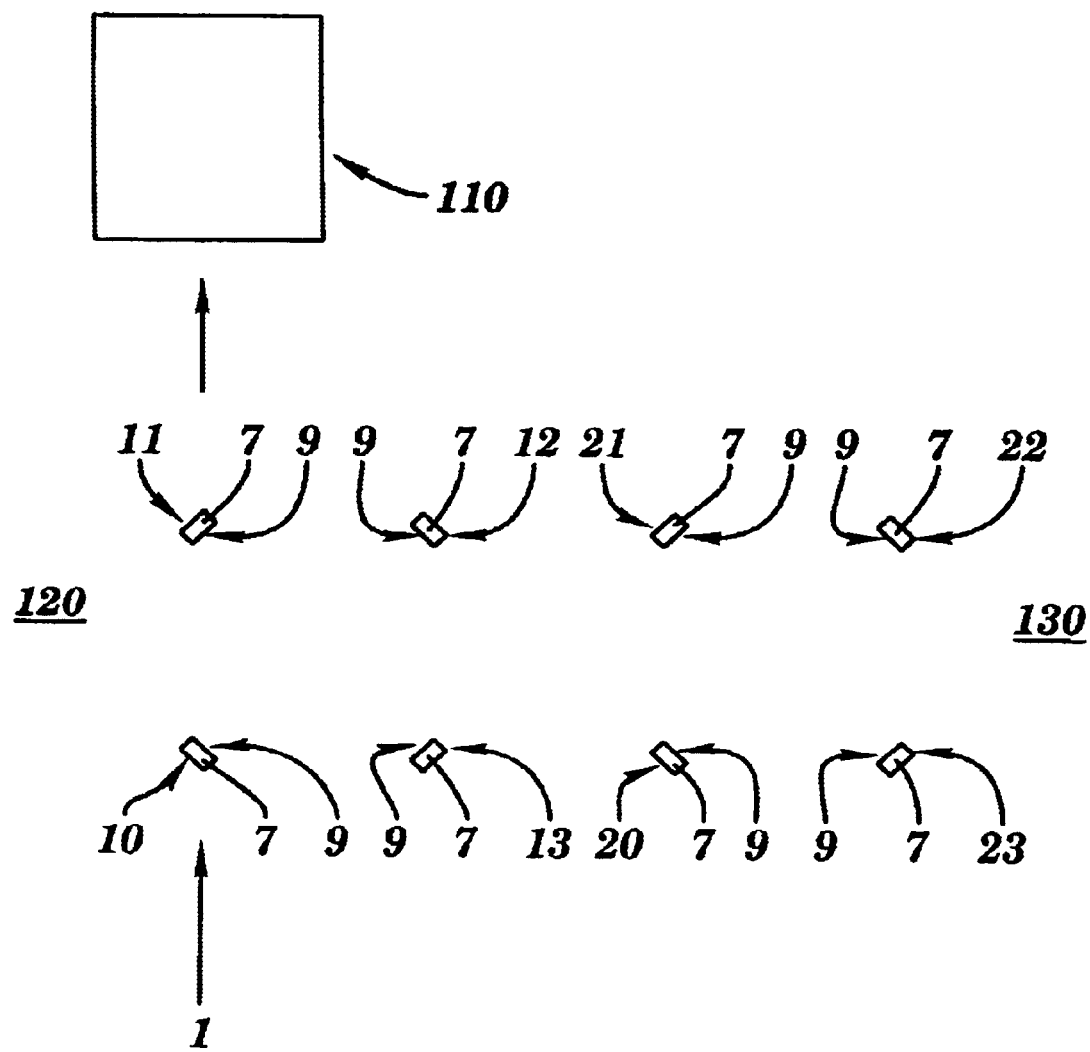
FIG. 13 illustrates one embodiment of an optical buffer utilizing the optical shutters of the present invention.

Referring to FIG. 13, in one embodiment of an optical buffer, utilizing the optical shutters of this invention having reversible imaging between both low and high absorption states of a photon-absorbing layer and between low and high reflectivity states of a surface layer of this invention, is illustrated. An optical signal 1 at a wavelength, such as, for example, 1620 nm, or at multiple wavelengths, such as, for example, 80 wavelengths in the range of 1530 to 1620 nm, is directed to an optical network destination 110, such as, for example, an optical switch device for network optical core switching or an optical amplifier or an electro-optic switch array for network edge switching, as described for example in "Architectural and Technological Issues for Future Optical Internet Networks," in *IEEE Communications Magazine*, September 2000, pages 82 to 92, and references therein, by Listanti et al., the disclosures of which are fully incorporated herein by reference. Optical signal 1 must pass through optical shutters 10 and 11 of optical buffer 120 prior to continuing on to optical network destination 110. If a data contention or other reason to delay the transmission of optical signal 1 occurs, optical shutter 11 comprising a surface layer 9 of a low reflectivity state and a photon-absorbing layer 7 is imaged, as described previously for the similar optical shutters 14 and 16 in FIG. 1. Optical signal 1 is then reflected to optical shutter 12 comprising a surface layer 9 of a low reflectivity state and a photon-absorbing layer 7 and, if delay in optical buffer 120 is desired, optical shutter 12 is imaged, as described previously for the similar optical shutters 14 and 16 in FIG. 1. Optical signal 1 is then reflected to optical shutter 13 comprising a surface layer 9 of a low reflectivity state and a photon-absorbing layer 7 and is imaged, as described previously for the similar type of optical shutters 14 and 16 in FIG. 1. Optical signal 1 is then reflected to optical shutter 10 comprising a surface layer 9 of a low reflectivity state and a photon-absorbing layer 7 and is imaged, as described previously for the similar type of optical shutters 14 and 16 in FIG. 1. Optical signal 1 is then reflected to optical shutter 11, which by the time optical signal 1 has traveled around optical buffer 120, has undergone the reverse reaction to regenerate the states of the low absorption and the low reflectivity.

If no further delay is required, optical shutter 11 is not imaged, and optical signal 1 continues on to optical network destination 110. If further delay is required, optical shutter 11 is imaged, and optical signal 1 is reflected again to optical shutter 12 and the process of storing or delaying optical signal 1 in optical buffer 120 continues until no further delay is required when optical signal 1 reaches optical shutter 11. If only a single optical buffer is required, optical shutters 12 and 13 do not need to be optical shutters and may be permanent reflective surfaces, such as mirrors. At about 0.3 mm per picosecond for the speed of light, the distance traveled by optical signal 1 in optical buffer 120 may be set to provide the desired delay time in a single loop or in multiples of single loops around optical buffer 120. If the desired delay time varies and can not be met with a single loop or any number of multiples of single loops, the distance for a single loop in optical buffer 120 may be adjusted by moving two or more of the four optical shutters or mirrors to create a new distance for a single loop or any number of multiple loops which matches the new desired delay time.

If delay or optical signal storage in optical buffer 130 is desired instead, optical shutter 12 is not imaged, and optical signal 1 continues on to optical buffer 130. Optical shutters 20, 21, 22, and 23 have the same layers and alternative permanent reflective surfaces as herein described for optical shutters 10, 11, 12, and 13, respectively, in FIG. 13. Thus, it can be seen that optical signal 1 may be circulated in a loop around optical buffer 130 by imaging the optical shutters and may continue back to optical buffer 120 if optical shutter 20 is not imaged when optical signal 1 reaches optical shutter 20. When optical signal 1 is back in optical buffer 120, optical signal 1 may be circulated in a loop around optical buffer 120 by imaging the optical shutters and may continue on to optical network destination 110 if optical shutter 11 is not imaged when optical signal 1 reaches optical shutter 11. An optical buffer, such as optical buffer 130, that does not have an optical shutter in the direct path of optical signal 1 to optical network connection 110 is particularly advantageous to avoid additional data contention by having the optical signals in the optical buffer, such as optical buffer 120, pass additional times through the input optical path. Also, this is useful when the desired delay time is long, such as more than 10 nanoseconds.

Similar optical buffers may be provided in other locations adjacent to optical buffers 120 and 130 in a manner similar to which optical buffers 120 and 130 are adjacent to each other and may also be accessed by optical signal 1. Also, the reflective surface of one or more optical shutters in a first optical buffer may be angled such that the optical signal is reflected to a second optical buffer on a different plane. Similarly, the reflective surface of one or more optical shutters in the second or other optical buffer may be angled such that the optical signal is reflected back to the plane of the first optical buffer. This would provide more flexibility in storing and retrieving the optical signals from a number of optical buffers of the present invention. Additional optical buffers would provide additional buffering capacity and additional flexibility in handling a variety of optical data packets which may have a wide range of byte sizes from, for example, 50 bytes to 1500 bytes and thus may have varying desired delay times which are not all integer multiples of each other. As one alternative to additional optical buffers connected optically to a first optical buffer, a single optical buffer may have more than two optical shutters on each edge of the optical buffer, such as, for example, 100 optical shutters opposite to each other on each edge instead of the two optical shutters opposite to each other on each edge in optical buffers 120 and 130, so that the delay time may be readily changed by the choice of which of the optical shutters to image when the optical signal reaches the specific optical shutter.

Thus, one aspect of the optical buffers of this invention pertains to an optical buffer for storing an optical signal for a desired time, which optical buffer comprises at least two optical shutters positioned at first distances and first angles from each other, wherein the at least two optical shutters are imageable by photons and have a first state of a low absorption at a wavelength and a second state of a high absorption at the wavelength, which optical shutters comprise a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein the at least two optical shutters are characterized by being reversibly imageable between the first and second states of absorption; and the at least two optical shutters further comprise a surface layer having a low reflectivity state at the wavelength, wherein the at least two optical shutters are characterized by absorption of said photons to form a surface layer having a high reflectivity state and by a reverse reaction of the high reflectivity state to regenerate the low reflectivity state, wherein the at least two optical shutters are characterized by being reversibly imageable between the low and high reflectivity states; and wherein at least two of the at least two optical shutters are interposed between an input path carrying the optical signal and an output path for the optical signal.

In one embodiment of the optical buffers of this invention, the absorption of the photons images the optical shutter from the first state of low absorption to the second state of high absorption. In one embodiment, the optical buffer further comprises two or more reflective surfaces, such as, for example, two or more "transparent-to-reflective" optical shutters or two mirrors, positioned at second distances and second angles from the at least two optical shutters to return the optical signal to at least one of the at least two optical shutters. In one embodiment, the first distances, first angles, second distances, and second angles are selected to return the optical signal in the desired time to one of the at least two optical shutters interposed between the input channel and the output channel. In one embodiment, the first distances, first angles, second distances, and second angles are adjustable to match changes in the desired time for storing the optical signal.

In the optical buffers of the present invention, the photon-absorbing layers of the optical shutter preferably comprise an organic free radical compound, but other materials that induce a reversible "transparent-to-opaque" imaging of the photon-absorbing layer may be utilized.

While the invention has been described in detail and with reference to specific and general embodiments thereof, it will be apparent to one skilled in the art that various changes and modifications can be made therein without departing from the spirit and scope thereof.

What is claimed is:

1. An optical switch device, said switch device comprising one or more optical input paths, two or more optical output paths, and one or more optical shutters, said one or more shutters having a first state of transparency and of low reflectivity at a range of wavelengths and a second state of opacity and of high reflectivity at said range of wavelengths, and at least one of said one or more shutters comprising a photon-absorbing layer and a surface layer on at least one side of said photon-absorbing layer, wherein said photon-absorbing layer comprises an organic free radical compound in at least one of said first and second states and is characterized by absorption of photons to form a reaction product having a change in absorption at said range of wavelengths; and wherein said at least one of said one or more shutters comprising said photon-absorbing and surface layers is characterized by being reversibly imageable between said first and second states; and wherein said switch device is characterized by being capable of switching an optical signal entering said switch device from one of said one or more input paths to a selected one of said two or more output paths.

2. The optical switch device of claim 1, wherein said at least one of said one or more shutters comprising said photon-absorbing and surface layers comprises a metallized layer on at least one side of said photon-absorbing layer.

3. The optical switch device of claim 2, wherein said metallized layer comprises aluminum.

4. The optical switch device of claim 1, wherein said absorption of photons images said at least one of said one or more shutters comprising said photon-absorbing and surface layers from said first state to said second state.

5. The optical switch device of claim 4, wherein said reaction product is said free radical compound.

6. The optical switch device of claim 1, wherein said absorption of photons images said at least one of said one or more shutters comprising said photon-absorbing and surface layers from said second state to said first state.

7. The optical switch device of claim 6, wherein said reaction product is formed from said free radical compound.

8. The optical switch device of claim 1, wherein absorption of photons reversibly images said at least one of said one or more shutters comprising said photon-absorbing and surface layers between said first and second states.

9. The optical switch device of claim 8, wherein the wavelength range of photons imaging said at least one of said one or more shutters comprising said photon-absorbing and surface layers from said first state to said second state is different from the wavelength range of photons for reversibly imaging from said second state to said first state.

10. The optical switch device of claim 1, wherein said reaction product is formed from said free radical compound.

11. The optical switch device of claim 1, wherein said reaction product is said free radical compound.

12. The optical switch device of claim 1, wherein said free radical compound is a salt of an aminium radical cation.

13. The optical switch device of claim 1, wherein said free radical compound is a salt of a tetrakis[4-(dialkylamino)phenyl]-1,4-benzenediamine radical cation.

14. The optical switch device of claim 1, wherein said free radical compound is a salt of a N,N-dialkyl-N',N'-bis[4-(dialkylamino)phenyl]-1,4-benzenediamine radical cation.

15. The optical switch device of claim 1, wherein said free radical compound is a salt of an anthrasemiquinone radical anion.

16. The optical switch device of claim 1, wherein the wavelength range of said photons to form said reaction product comprises one or more ultraviolet wavelengths.

17. The optical switch device of claim 1, wherein the wavelength range of said photons to form said reaction product comprises one or more wavelengths from 400 to 700 nm.

18. The optical switch device of claim 1, wherein the wavelength range of said photons to form said reaction product comprises one or more wavelengths from 700 to 2000 nm.

19. The optical switch device of claim 1, wherein said range of wavelengths is from 400 to 2000 nm.

20. The optical switch device of claim 1, wherein said range of wavelengths is from 1000 to 1700 nm.

21. The optical switch device of claim 1, wherein said range of wavelengths is from 1400 to 1700 nm.

22. The optical switch device of claim 1, wherein said range of wavelengths is from 1500 to 1700 nm.

23. The optical switch device of claim 1, wherein said switch device further comprises an optical wavelength conversion element to convert said optical signal having a first wavelength to an optical signal of a second different wavelength.

24. The optical switch device of claim 23, wherein said optical wavelength conversion element comprises an organic free radical compound as an active material for converting the wavelength of said optical signal having a first wavelength.

25. An optical switch device, said switch device comprising one or more optical input paths, two or more optical output paths, and one or more optical shutters, said one or more shutters having a first state of transparency and of low reflectivity at a range of wavelengths and a second state of opacity and of high reflectivity at said range of wavelengths, and at least one of said one or more shutters comprising a first surface layer in a transparent state, a second surface layer in a transparent state, and a photon-absorbing layer in a transparent state and interposed between said first and second surface layers, wherein said at least one of said one or more shutters comprising said photon-absorbing and surface layers is characterized by absorption of photons to change at least one of said first and second surface layers to a state of high reflectivity and to change said photon-absorbing layer to a state of opacity, and further is characterized by being reversibly imageable between said first and second states; and wherein said switch device is characterized by being capable of switching an optical signal entering said switch device from one of said one or more input paths to a selected one of said two or more output paths.

26. The optical switch device of claim 25, wherein said at least one of said one or more optical shutters comprising said photon-absorbing and surface layers is characterized by the absorption of photons to change both of said first and second surface layers to a state of high reflectivity.

27. The optical switch device of claim 26, wherein the changes in reflectivity of said first and second surface layers occur reversibly at the same time.

28. The optical switch device of claim 25, wherein said at least one of said one or more optical shutters comprising said photon-absorbing and surface layers comprises a metallized layer on at least one side of said photon-absorbing layer.

29. The optical switch device of claim 28, wherein said metallized layer comprises aluminum.

30. The optical switch device of claim 25, wherein the reversible imaging from said second state to said first state occurs with no external source of energy.

31. The optical switch device of claim 25, wherein the reversible imaging from said second state to said first state is induced by heat.

32. The optical switch device of claim 25, wherein the reversible imaging from said second state to said first state is induced by absorption of photons from one or more wavelength ranges selected from the group consisting of ultraviolet wavelength ranges, visible wavelength ranges, and infrared wavelength ranges.

33. The optical switch device of claim 25, wherein said first and second surface layers are in direct contact to said photon-absorbing layer.

34. The optical switch device of claim 25, wherein at least one of said first and second surface layers is not in direct contact to said photon-absorbing layer.

35. The optical switch device of claim 25, wherein said at least one of said one or more shutters comprising said photon-absorbing and surface layers comprises two or more photon-absorbing layers interposed between said first and second surface layers.

36. The optical switch device of claim 35, wherein said first surface layer is in direct contact to a first one of said two or more photon-absorbing layers and said second surface layer is in direct contact to a second one of said two or more photon-absorbing layers.

37. The optical switch device of claim 25, wherein said photon-absorbing layer comprises an organic free radical compound and is characterized by an absorption of photons to form a reaction product having a change in absorption at said range of wavelengths.

38. The optical switch device of claim 37, wherein said reaction product is said free radical compound.

39. The optical switch device of claim 37, wherein said absorption of photons images said at least one of said one or more shutters comprising said photon-absorbing and surface layers from said second state to said first state.

40. The optical switch device of claim 39, wherein said reaction product is formed from said free radical compound.

41. The optical switch device of claim 37, wherein said free radical compound is a salt of an aminium radical cation.

42. The optical switch device of claim 37, wherein said free radical compound is a salt of a tetrakis[4-(dialkylamino)phenyl]-1,4-benzenediamine radical cation.

43. The optical switch device of claim 37, wherein said free radical compound is a salt of a N,N-dialkyl-N',N'-bis[4-(dialkylamino)phenyl]-1,4-benzenediamine radical cation.

44. The optical switch device of claim 37, wherein said free radical compound is a salt of an anthrasemiquinone radical anion.

45. The optical switch device of claim 37, wherein the wavelength range of said photons to form said reaction product comprises one or more ultraviolet wavelengths.

46. The optical switch device of claim 37, wherein the wavelength range of said photons to form said reaction product comprises one or more wavelengths from 400 to 700 nm.

47. The optical switch device of claim 37, wherein the wavelength range of said photons to form said reaction product comprises one or more wavelengths from 700 to 2000 nm.

48. The optical switch device of claim 25, wherein reversible imaging between said first and second states is induced by absorption of photons, and wherein the wavelength range of photons imaging said shutter from said first state to said second state is different from the wavelength range of photons imaging said shutter from said second state to said first state.

49. The optical switch device of claim 25, wherein said range of wavelengths is from 400 to 2000 nm.

50. The optical switch device of claim 25, wherein said range of wavelengths is from 1000 to 1700 nm.

51. The optical switch device of claim 25, wherein said range of wavelengths is from 1400 to 1700 nm.

52. The optical switch device of claim 25, wherein said range of wavelengths is from 1500 to 1700 nm.

53. The optical switch device of claim 25, wherein an optical combining device is present in at least one of said two or more output paths to direct said optical signal to a selected one of said two or more output paths.

54. The optical switch device of claim 25, wherein a first fixed mirror is present in said one of said one or more input paths and a second fixed mirror is present in said selected one of said two or more output paths when said optical signal is switched between the input and output paths in said switch device.

55. The optical switch device of claim 25, wherein said optical signal is reflected from said at least one of said first and second surface layers at an angle from 1° and 89°.

56. The optical switch device of claim 25, wherein said optical signal is reflected from said at least one of said first and second surface layers at an angle of 45°.

57. The optical switch device of claim 25, wherein the number of said one or more input paths is from 2 to 1280, the number of said two or more output paths is from 2 to 1280, and the number of said optical shutters comprising said photon-absorbing and surface layers is from 1 to 9600.

58. The optical switch device of claim 25, wherein said switch device is connected to an optical input path or to an optical output path of one or more other optical switch devices.

59. The optical switch device of claim 25, wherein said second surface layer is reflective in said second state so that a different optical signal can be reflected when said first surface layer is reflecting said optical signal.

60. The optical switch device of claim 25, wherein optical signals in said one or more input paths and said two or more output paths are bi-directional, and said switch device is characterized by the ability to switch optical signals traveling in opposite directions through said switch device.

61. The optical switch device of claim 25, wherein said switch device comprises one or more external energy source elements to provide energy to switch said optical shutter comprising said photon-absorbing and surface layers; wherein said one or more external energy source elements are selected from the group consisting of electrical current source elements, heating source elements, ultraviolet light source elements, visible light source elements, and infrared radiation source elements.

62. The optical switch device of claim 61, wherein said one or more external energy source elements are connected to an optical switch control circuit device that monitors the desired timing for providing said energy and delivers a signal to said one or more external sources of energy to provide said energy to said at least one of said one or more shutters comprising said photon-absorbing and surface layers.

63. The optical switch device of claim 25, wherein said optical signal travels in free space in said one or more input paths and in a selected one of said two or more output paths immediately prior to and immediately after said optical signal reaches said at least one of said one or more shutters comprising said photon-absorbing and surface layers.

64. The optical switch device of claim 63, wherein said switch device comprises a lens in said two or more output paths to focus said optical signal.

65. The optical switch device of claim 25, wherein said optical signal travels in a waveguide in said one or more input paths and in a selected one of said two or more output paths immediately prior to and immediately after said optical signal reaches said at least one of said one or more shutters comprising said photon-absorbing and surface layers.

66. The optical switch device of claim 65, wherein said waveguide in said two or more output paths is tapered from a larger dimension in contact to at least one of said first and second surface layers to a smaller dimension at a distance from said at least one of said first and second surface layers.

67. An optical cross-bar switch device, comprising:
(a) an array of optical shutters arranged in a plurality of columns and rows, each optical shutter having a first state of transparency and of low reflectivity in a range of wavelengths and a second state of opacity and of high reflectivity in said range of wavelengths, said shutter comprising a first surface layer in a transparent state, a second surface layer in a transparent state, and a photon-absorbing layer in a transparent state and interposed between said first and second layers, wherein said optical shutter is characterized by the absorption of photons to change at least one of said first and second surface layers to a state of high reflectivity and to change said photon-absorbing layer to a state of opacity; wherein said optical shutter is characterized by being reversibly imageable between said first and second states; and
(b) a plurality of fiber optic ports, each fiber optic port disposed at a respective one of the columns and rows and capable of emitting and receiving a light beam so that when the light beam from a light emitting fiber optic port located at a selected one of the columns and rows is transmitted to a selected light receiving fiber optic port located at a selected remaining one of the columns and rows, the optical shutter located at an intersection formed by the selected column and row is switched to change from the non-reflective state to the reflective state to reflect the light beam from the light emitting fiber optic port to the selected light receiving fiber optic port.

68. The optical cross-bar switch device of claim 67, wherein said switch device further comprises a plurality of collimator elements, each collimator element being disposed adjacent to respective ones of each fiber optic port and between each fiber optic port and the optical shutters.

69. The optical cross-bar switch device of claim 67, wherein when the optical shutter located at the intersection formed by the selected column and row is in said second state, remaining ones of the optical shutters located in the selected column and row are in said first state.

70. The optical cross-bar switch device of claim 69, wherein a plurality of light beams from a plurality of light emitting fiber optic ports located at selected ones of the columns and rows are transmitted to a plurality of selected light receiving fiber optic ports located at selected remaining ones of the rows and columns through a plurality of optical shutters located at respective intersections formed by the selected columns and rows in the respective second states.

71. The optical cross-bar switch device of claim 67, wherein the plurality of rows are oriented parallel to each other, the plurality of columns are oriented parallel to each other, and the plurality of rows and columns are oriented perpendicularly relative to each other.

* * * * *